United States Patent
Akiyama et al.

(10) Patent No.: US 8,212,176 B2
(45) Date of Patent: Jul. 3, 2012

(54) MACHINING HEAD, NOZZLE CHANGER AND LASER BEAM MACHINING APPARATUS

(75) Inventors: Takashi Akiyama, Tokyo (JP); Masahiko Hasegawa, Tokyo (JP); Kazunobu Katase, Tokyo (JP); Shigeru Yokoi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 1309 days.

(21) Appl. No.: 11/905,613

(22) Filed: Oct. 2, 2007

(65) Prior Publication Data

US 2008/0099452 A1 May 1, 2008

(30) Foreign Application Priority Data

Oct. 27, 2006 (JP) .................................. 2006-292001

(51) Int. Cl.
*B23K 26/14* (2006.01)
*B23K 26/16* (2006.01)

(52) U.S. Cl. .......... 219/121.67; 219/121.84; 219/121.83

(58) Field of Classification Search .............. 219/121.67, 219/121.84, 121.83, 121.78, 121.6; 483/16
See application file for complete search history.

(56) References Cited

U.S. PATENT DOCUMENTS

| | | | |
|---|---|---|---|
| 5,149,937 A | 9/1992 | Babel et al. | |
| 5,225,650 A | 7/1993 | Babel et al. | |
| 5,239,552 A * | 8/1993 | Okuyama et al. | ............... 372/58 |
| 6,359,256 B1 | 3/2002 | Biermann et al. | |
| 6,797,917 B1 * | 9/2004 | Yamaoku et al. | ......... 219/121.67 |
| 6,894,248 B2 * | 5/2005 | Arakawa et al. | ......... 219/121.67 |
| 7,129,441 B2 * | 10/2006 | Yamazaki et al. | ....... 219/121.78 |
| 7,626,136 B2 * | 12/2009 | Sato et al. | ................ 219/121.63 |
| 2005/0061790 A1 | 3/2005 | Lambert et al. | |
| 2007/0000888 A1 * | 1/2007 | Yamazaki et al. | ....... 219/121.78 |

FOREIGN PATENT DOCUMENTS

| | | |
|---|---|---|
| DE | 76 30 484 U1 | 5/1980 |
| DE | 38 14 074 | 11/1989 |
| DE | 89 11 733 U1 | 11/1989 |
| DE | 199 44 484 | 4/2001 |
| DE | 10 2004 051 225 | 5/2006 |

(Continued)

OTHER PUBLICATIONS

Office Action issued in the corresponding German Patent Application No. 10 2007 050 878.8-34 dated Jan. 21, 2010, and an English Translation thereof.

(Continued)

*Primary Examiner* — M. Alexandra Elve
(74) *Attorney, Agent, or Firm* — Buchanan Ingersoll & Rooney PC

(57) ABSTRACT

A machining head includes
a machining head element having an inner-head channel for passing laser light and assist gas,
the nozzle having an inner-nozzle channel connecting to the inner-head channel and a nozzle orifice,
pins protruding radially inward from a curved inner surface of the nozzle,
a pin-locking part formed on the outside of the machining head element, the pin-locking part having pin-fitting openings,
a head alignment part formed on a nozzle-side end surface of the machining head element,
a nozzle alignment part formed on the nozzle at a location where the nozzle is aligned with the machining head element, and
an O-ring fitted between the head alignment part and the nozzle to create a clearance between the head alignment part and the nozzle alignment part for mutual alignment.

13 Claims, 24 Drawing Sheets

FOREIGN PATENT DOCUMENTS

| | | |
|---|---|---|
| EP | 1 506 833 | 2/2005 |
| JP | 59-024595 | 2/1984 |
| JP | 07-185865 | 7/1995 |
| JP | 10-006062 | 1/1998 |
| JP | 10-43879 A | 2/1998 |
| JP | 2003-260582 A | 9/2003 |
| JP | 2004-098093 A | 4/2004 |

OTHER PUBLICATIONS

German Office Action in corresponding Application No. 10 2007 050 878.8-34 dated Mar. 2, 2009, and an English Translation thereof.

Chinese Office Action in corresponding Application No. 2007101678093 dated Apr. 20, 2009.

* cited by examiner

MACHINING HEAD, NOZZLE CHANGER AND LASER BEAM MACHINING APPARATUS

BACKGROUND OF THE INVENTION

1. Field of the Invention

The present invention relates generally to a laser beam machining apparatus and, more particularly, to a laser machining head of a laser beam machining apparatus provided with an easily replaceable nozzle as well as to a nozzle changer.

2. Description of the Background Art

There exist various types of conventionally known laser beam machining apparatuses used for machining (e.g., hot-cutting) a workpiece by use of laser light. In a floor-mount laser beam machining apparatus, for example, a nozzle through which assist gas is ejected against a work is provided on an optical axis of laser light at a lower part of a machining head. Being an element normally positioned close to a machining point, the nozzle is apt to collect debris (slag and dross) molten from the work, or even melt due to reflected laser light or the heat of adhering molten material of the work, during laser cutting operation. Different types of nozzles are used depending on the material and thickness of the work to be cut. Therefore, the nozzle is normally detachably fitted to the machining head for easy replacement in a laser beam machining apparatus. Typically, the laser beam machining apparatus is provided with a nozzle changing mechanism to facilitate nozzle replacement. As an example, Japanese Patent Application Publication No. 2004-98093 proposes a machining head combined with a nozzle which together constitute a built-in nozzle changing mechanism including a ball plunger for aligning axes of the machining head and the nozzle with each other and a ball plunger detent (positioning recess).

In the aforementioned conventional laser beam machining apparatus, the nozzle changing mechanism is configured to align the axis of the machining head with the axis of the nozzle by means of the ball plunger and the detent which mates with the ball plunger. In this nozzle changing mechanism, the ball plunger is located apart from the nozzle axis, and the mechanism does not include any arrangement for preventing the nozzle from turning around an axis of the ball plunger. Thus, the nozzle is left turnable around the ball plunger which is located apart from the nozzle axis. Consequently, there arises a problem that the nozzle can be replaced only with poor alignment of the axes of the machining head and the nozzle, or with poor concentricity thereof, and poor nozzle positioning reproducibility. A further problem which develops when the axes of the machining head and the nozzle are poorly aligned or when the nozzle is not positioned at an ideal distance form the work is that each cycle of nozzle replacement requires a nozzle alignment task to be done and a large amount of time for performing the task to accomplish high-quality machining.

SUMMARY OF THE INVENTION

The present invention is intended to solve the aforementioned problems of the prior art. Accordingly, it is an object of the invention to provide a laser machining head, a nozzle changer and a laser beam machining apparatus which make it possible to easily replace a nozzle without the need to perform a nozzle alignment task at each cycle of nozzle replacement for accomplishing high-quality machining.

In one aspect of the invention, a machining head includes a machining head element having an inner-head channel formed therein to provide a passageway for laser light and assist gas, a nozzle formed separately from the machining head element, the nozzle having an inner-nozzle channel formed therein to connect to the inner-head channel and a nozzle orifice through which the laser light and the assist gas are directed toward a work, the nozzle orifice being formed at an extreme downstream end of the nozzle, pins formed to protrude radially from a side wall of the nozzle, a pin-locking part formed on a side wall of the machining head element, the pin-locking part having pin-fitting openings to allow the pins to be passed through and then placed in direct contact with and locked in position on the pin-locking part, a head alignment part formed on a nozzle-side end surface of the machining head element, a nozzle alignment part formed on the nozzle at a location where the nozzle is aligned with the machining head element, and an elastic member fitted between the head alignment part and the nozzle in a closed loop form to create a clearance between the head alignment part and the nozzle alignment part for mutual alignment.

The machining head thus structured allows easy replacement of the nozzle.

In another aspect of the invention, a nozzle changer replaces a nozzle of a machining head which includes a machining head element having an inner-head channel formed therein to provide a passageway for laser light and assist gas, the aforementioned nozzle formed separately from the machining head element, the nozzle having an inner-nozzle channel formed therein to connect to the inner-head channel and a nozzle orifice through which the laser light and the assist gas are directed toward a work, the nozzle orifice being formed at an extreme downstream end of the nozzle, pins formed to protrude radially from a side wall of the nozzle, a pin-locking part formed on a side wall of the machining head element, the pin-locking part having pin-fitting openings to allow the pins to be passed through and then placed in direct contact with and locked in position on the pin-locking part, a head alignment part formed on a nozzle-side end surface of the machining head element, a nozzle alignment part formed on the nozzle at a location where the nozzle is aligned with the machining head element, and an elastic member fitted between the head alignment part and the nozzle in a closed loop form to create a clearance between the head alignment part and the nozzle alignment part for mutual alignment. This nozzle changer includes a nozzle supporting rod which is fitted into the nozzle orifice of the nozzle and thereby supports the nozzle, and a nozzle changing unit which, under conditions where the nozzle supporting rod is fitted in the nozzle orifice of the nozzle, performs nozzle fitting process in which the nozzle changing unit rotates the nozzle and causes the pins to pass through the respective pin-fitting openings of the machining head element and lock onto the pin-locking part as well as nozzle removal process in which the nozzle changing unit rotates the nozzle and causes the pins to pass through the respective pin-fitting openings of the machining head element to disengage the nozzle therefrom.

The nozzle changer thus structured can easily replace the nozzle.

In still another aspect of the invention, a laser beam machining apparatus includes a machining head including a machining head element having an inner-head channel formed therein to provide a passageway for laser light and assist gas, a nozzle formed separately from the machining head element, the nozzle having an inner-nozzle channel formed therein to connect to the inner-head channel and a nozzle orifice through which the laser light and the assist gas are directed toward a work, the nozzle orifice being formed at an extreme downstream end of the nozzle, pins formed to protrude radially from a side wall of the nozzle, a pin-locking part formed on a side wall of the machining head element, the pin-locking part having pin-fitting openings to allow the pins to be passed through and then placed in direct contact with and locked in position on the pin-locking part, a head alignment part formed on a nozzle-side end surface of the machining head element, a nozzle alignment-part formed on the nozzle at a location where the nozzle is aligned with the machining head element, and an elastic member fitted between the head alignment part and the nozzle in a closed loop form to create a clearance between the head alignment part and the nozzle alignment part for mutual alignment. The laser beam machining apparatus further includes a laser oscillation unit for producing the laser light to be led into the machining head, an assist gas supply unit for supplying the assist gas to be fed into the machining head, a stage on which the work is placed, and a moving device for adjusting the position of a specified point of the stage relative to the position of the machining head element.

The laser beam machining apparatus thus structured also allows easy replacement of the nozzle.

The foregoing and other objects, features, aspects and advantages of the present invention will become more apparent from the following detailed description when read in conjunction with the accompanying drawings.

DETAILED DESCRIPTION OF THE PREFERRED EMBODIMENT OF THE INVENTION

A specific embodiment of the present invention will now be described, by way of example, with reference to the accompanying drawings.

First Embodiment

Figure 1:
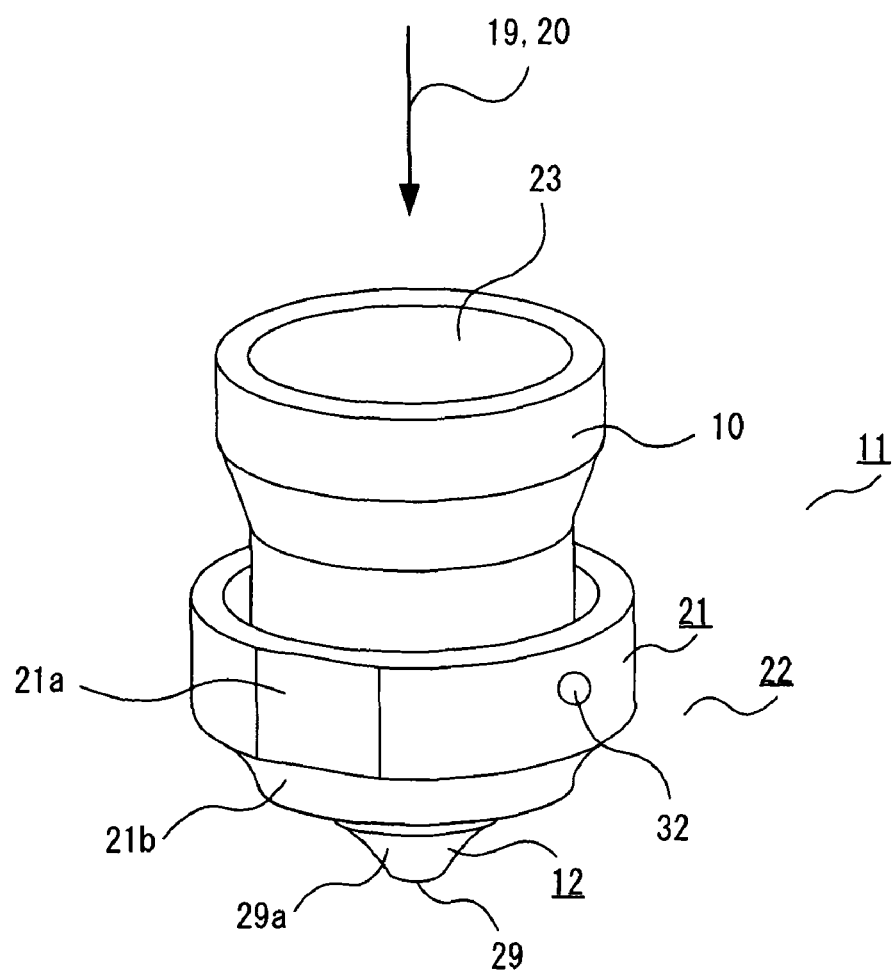
FIG. 1 is a perspective view showing the structure of a machining head according to a first embodiment of the invention.
Figure 2:
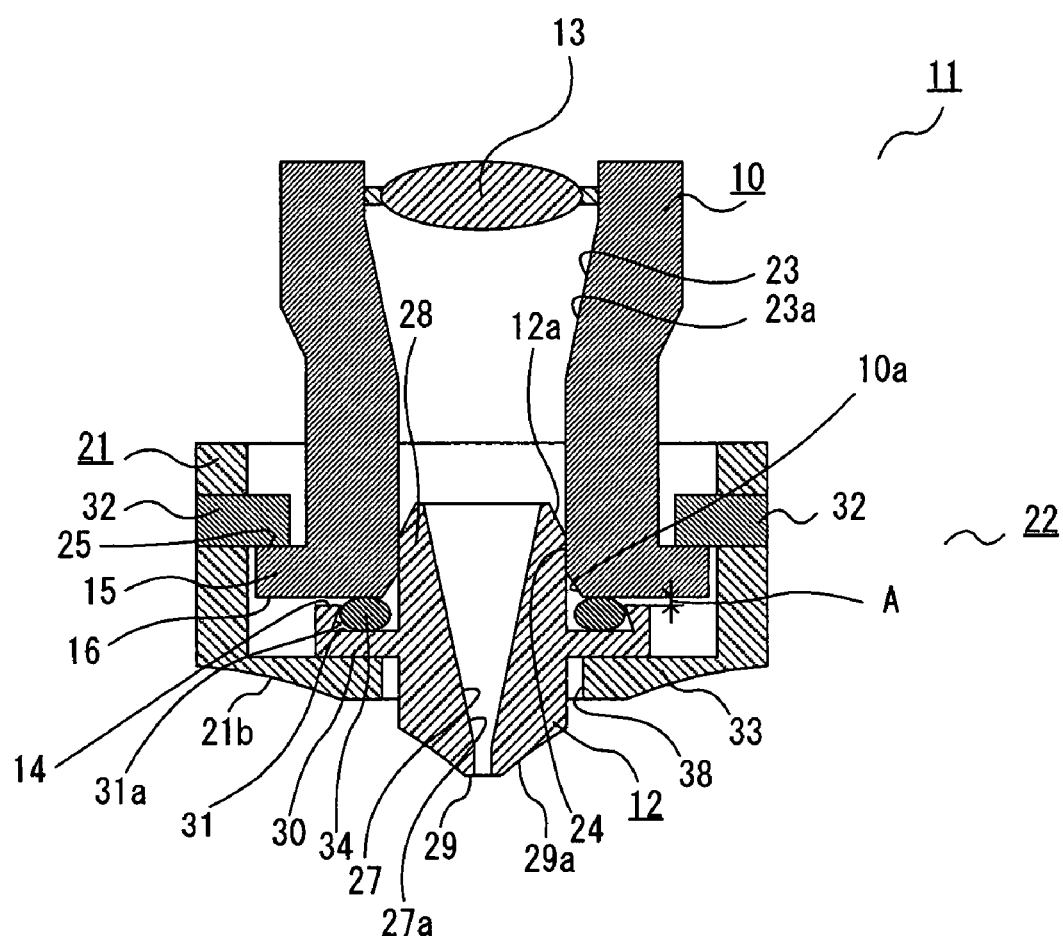
FIG. 2 is a cross-sectional view of the machining head of FIG. 1.
Figure 3:
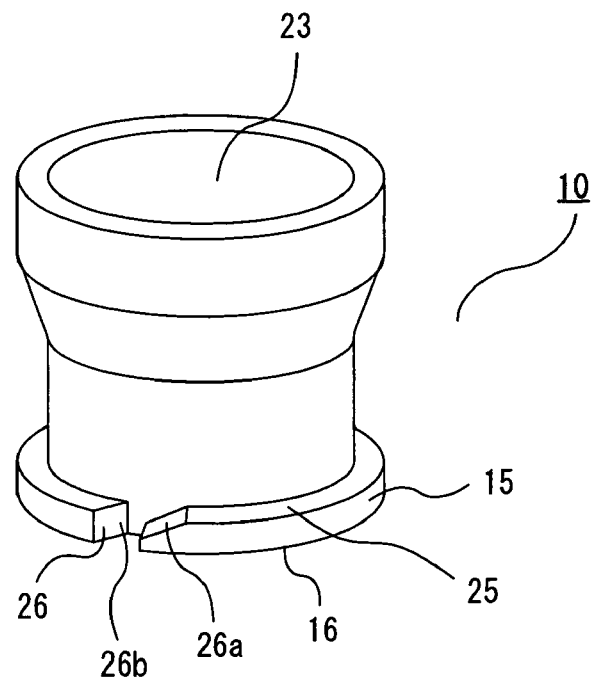
FIG. 3 is a perspective view of a machining head element of the machining head of FIG. 1.
Figure 4:
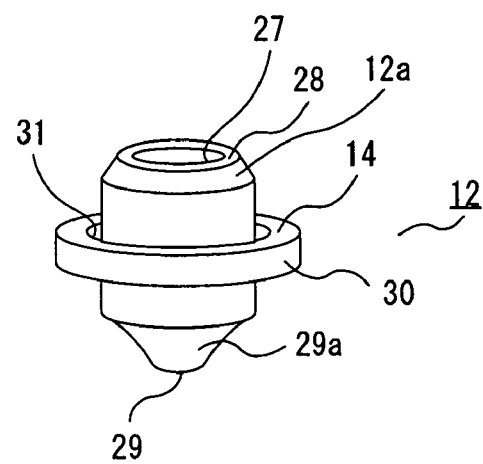
FIG. 4 is a perspective view of a nozzle element of a nozzle of the machining head of FIG. 1.
Figure 5A:
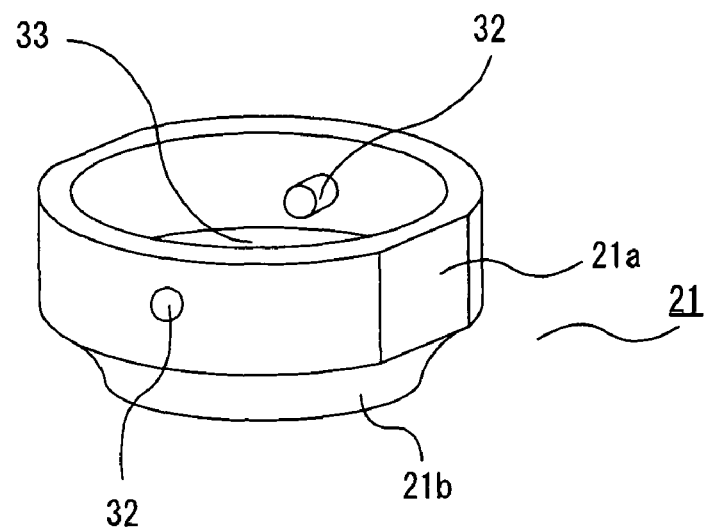
FIGS. 5A and 5B are perspective and top views of a nozzle fixture of the nozzle of the machining head of FIG. 1, respectively.
Figure 5B:
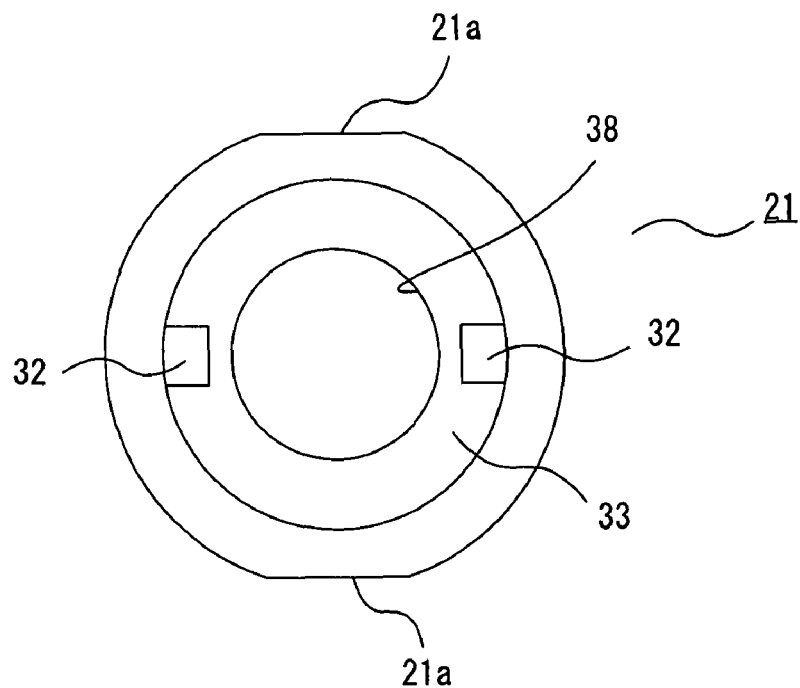
Figure 6:
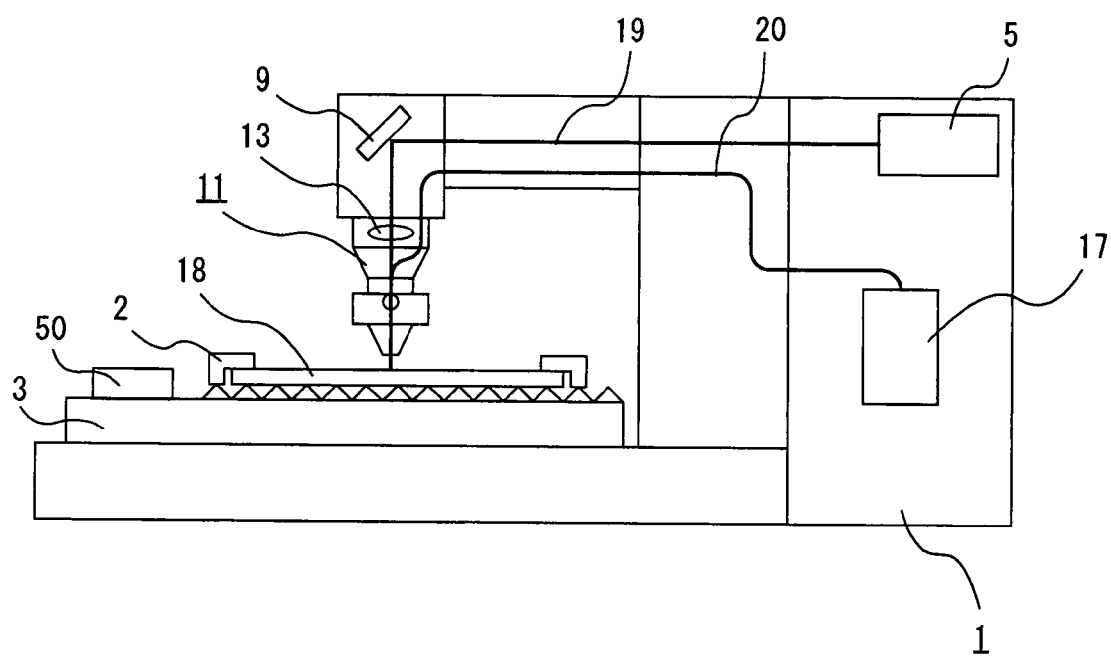
FIG. 6 is a diagram schematically showing the structure of a laser beam machining apparatus employing the machining head shown in FIG. 1.
Figure 7A:
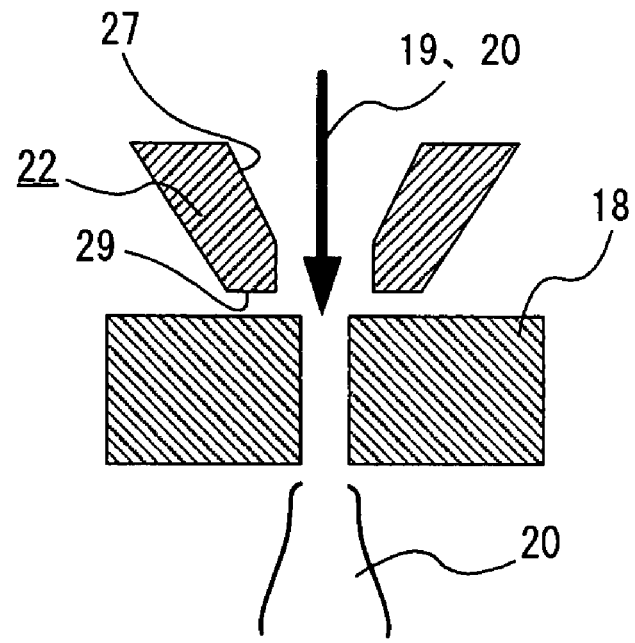
FIGS. 7A and 7B are diagrams for explaining a potential problem which may occur with the machining head of the laser beam machining apparatus of FIG. 6.
Figure 7B:
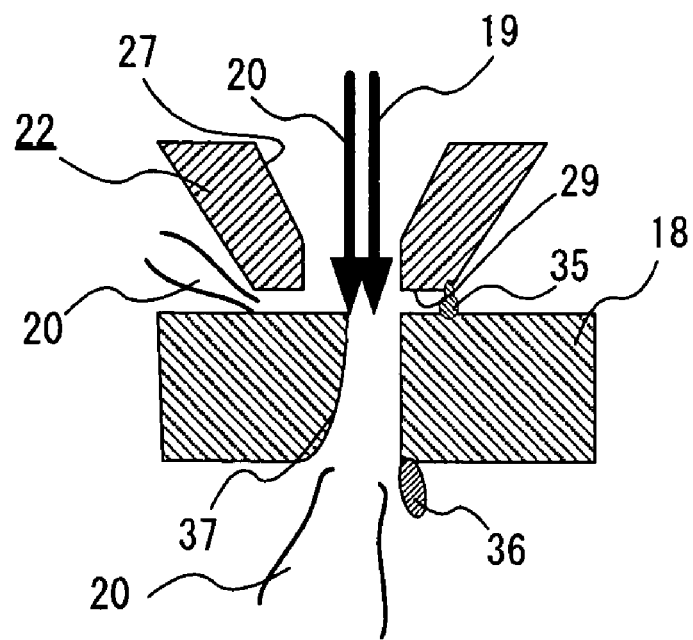
Figure 8A:
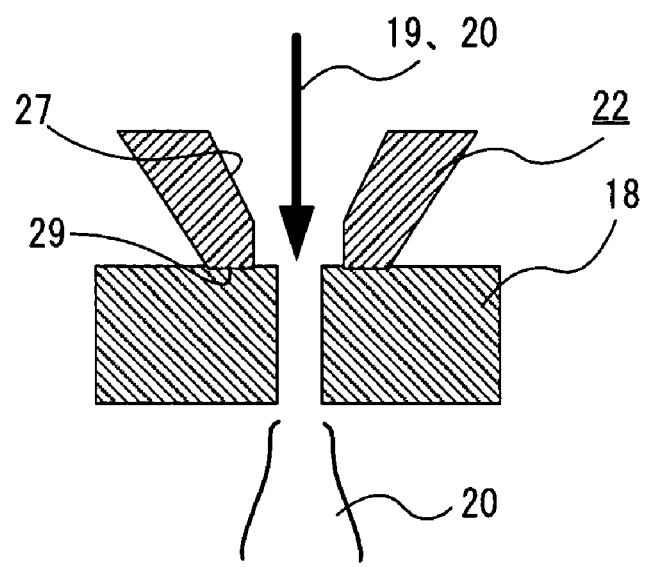
FIGS. 8A and 8B are diagrams for explaining another potential problem which may occur with the machining head of the laser beam machining apparatus of FIG. 6.
Figure 8B:
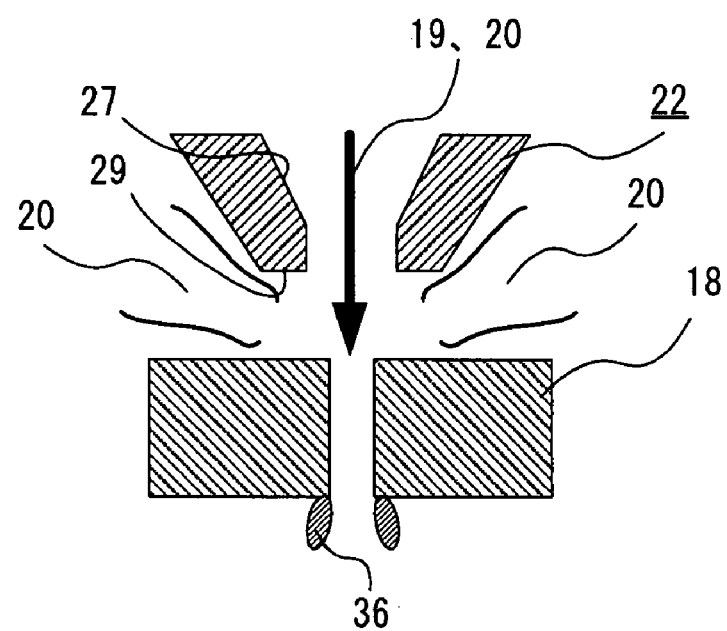
Figure 9:
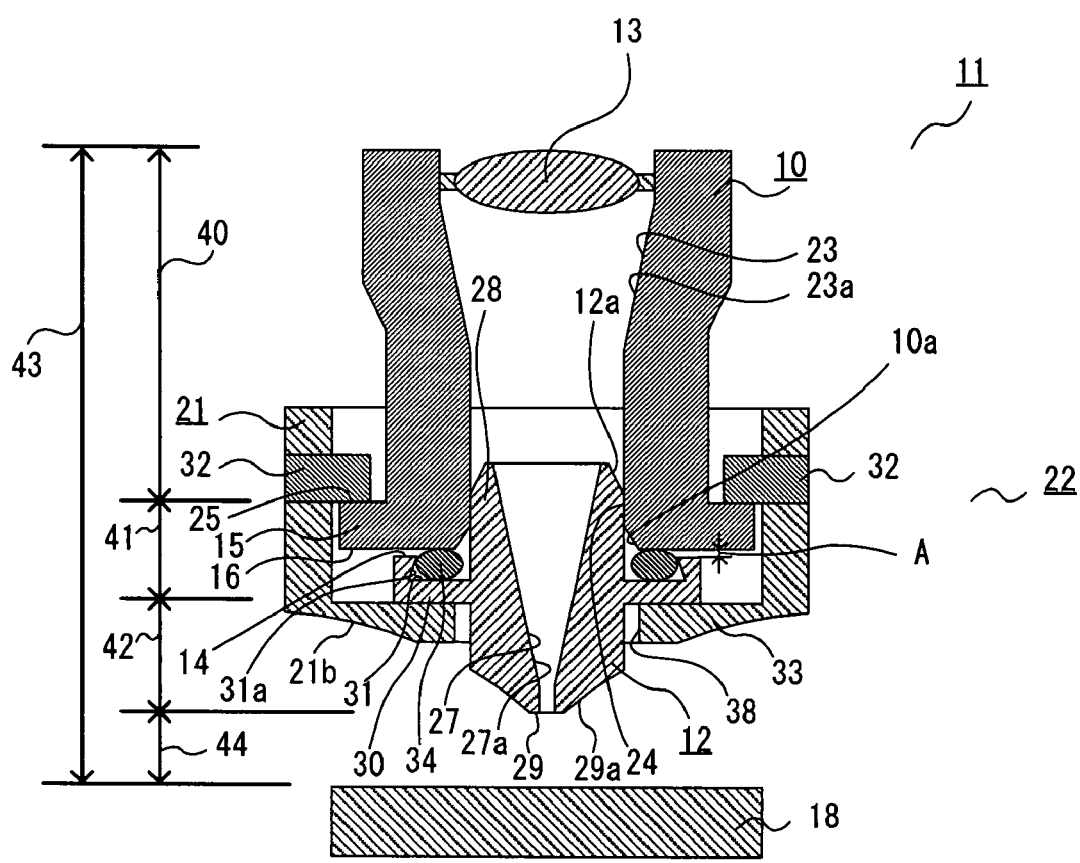
FIG. 9 is a cross-sectional diagram for explaining vertical dimensional accuracy of the machining head of FIG. 1.
Figure 12A:
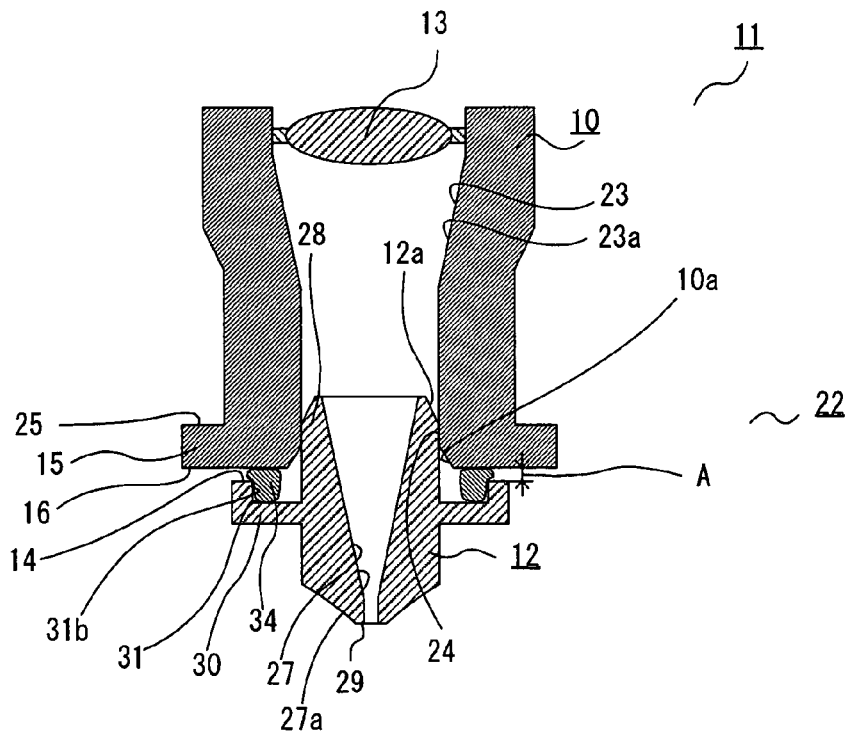
FIGS. 12A and 12B are cross-sectional diagrams showing how an O-ring (elastic member) of the machining head of FIG. 1 works.
Figure 12B:
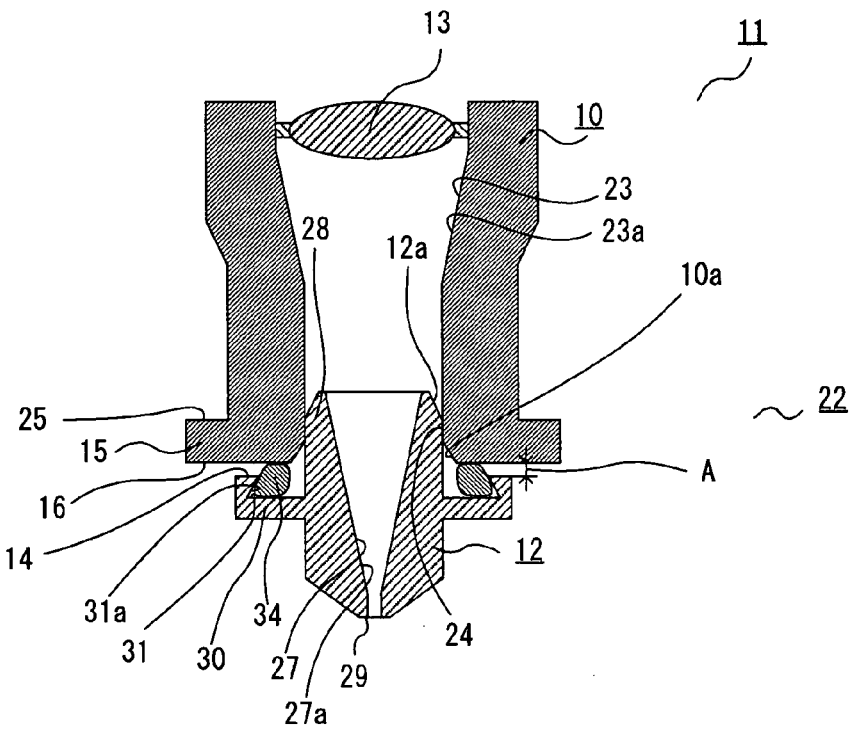
Figure 13A:
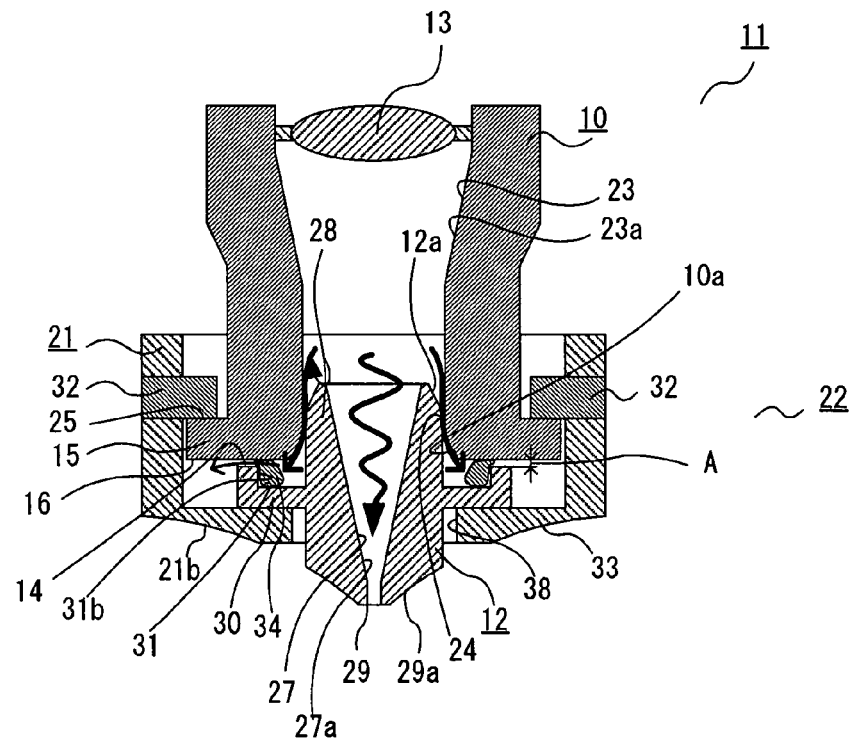
FIGS. 13A and 13B are cross-sectional diagrams also showing how the O-ring (elastic member) of the machining head of FIG. 1 works.
Figure 13B:
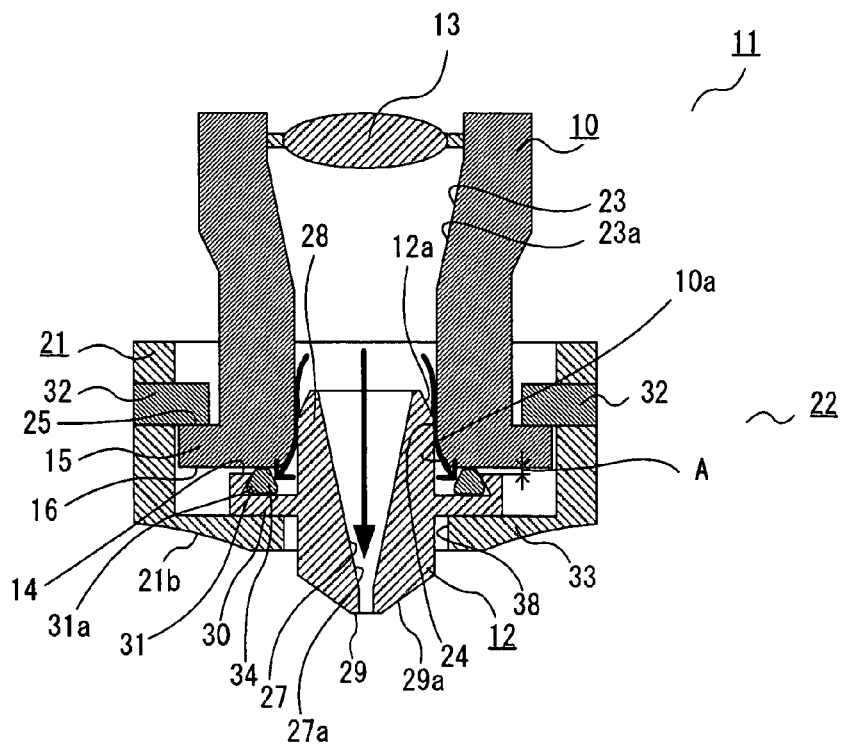
Figure 14:
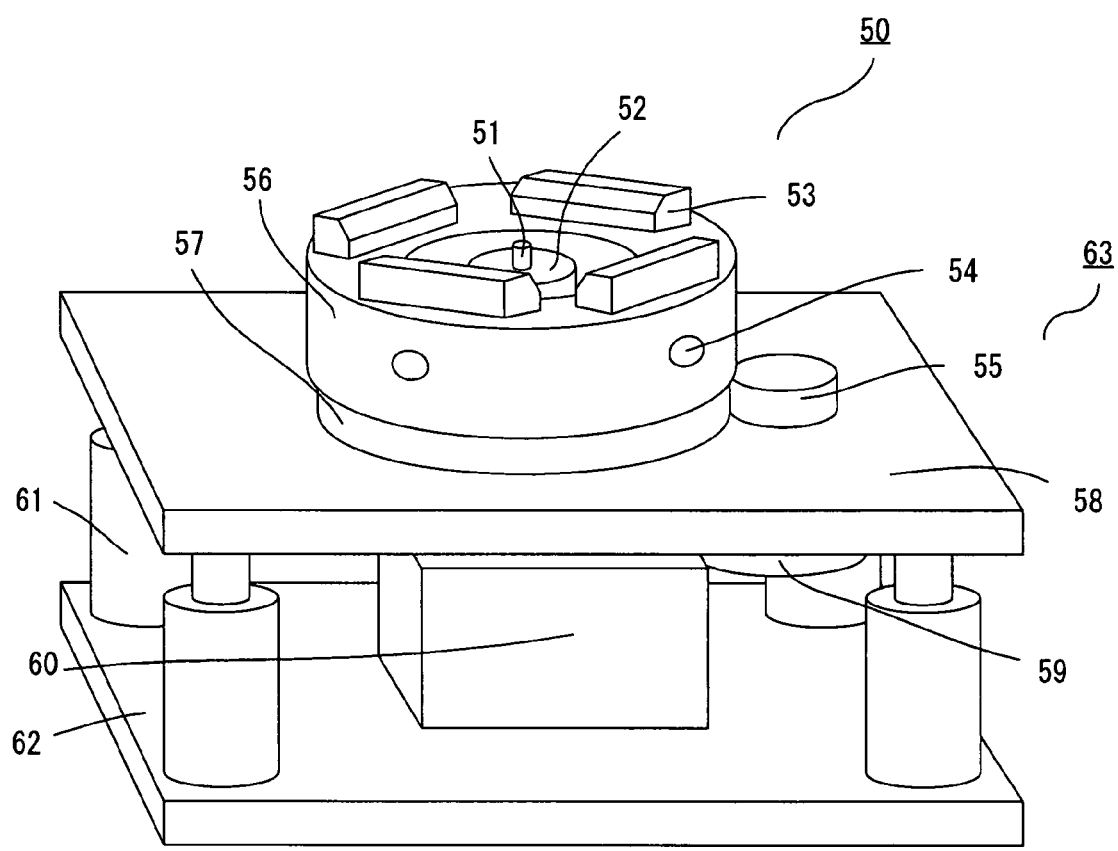
FIG. 14 is a perspective view of a nozzle changer for replacing the machining head 11 shown in FIG. 1.
Figure 15:
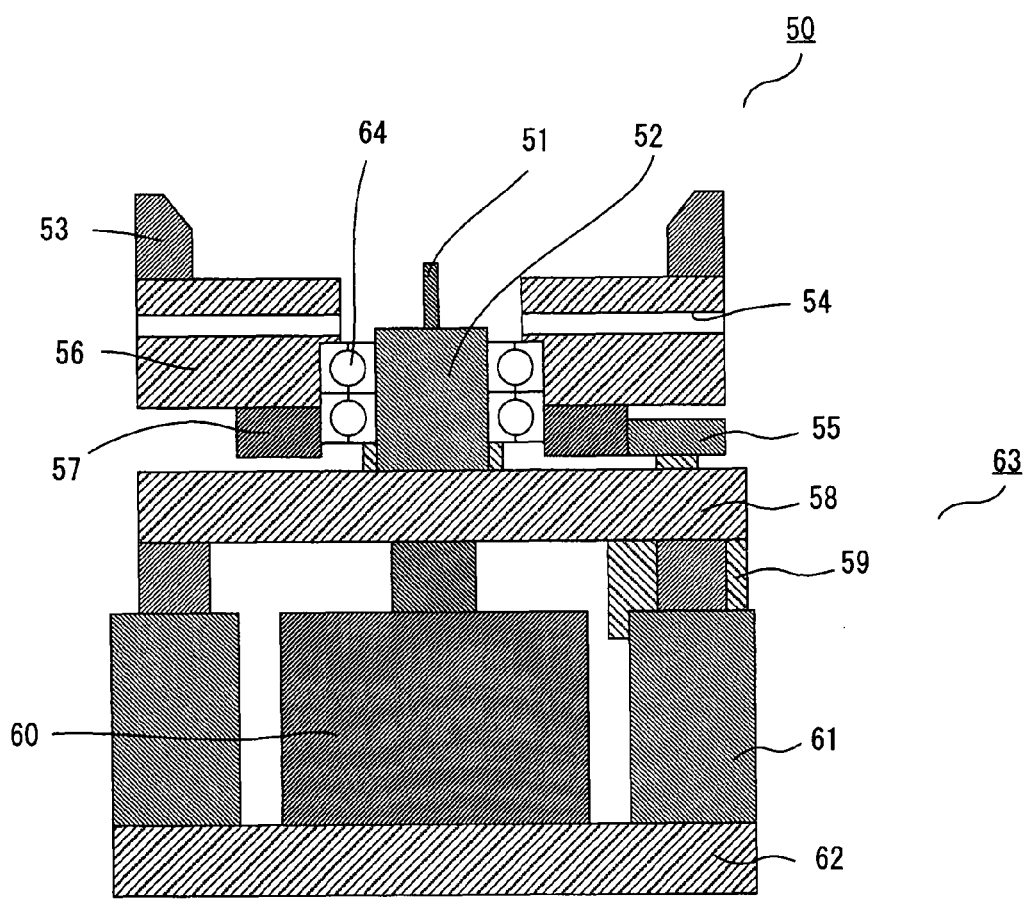
FIG. 15 is a cross-sectional diagram showing the structure of the nozzle changer of FIG. 14.
Figure 16:
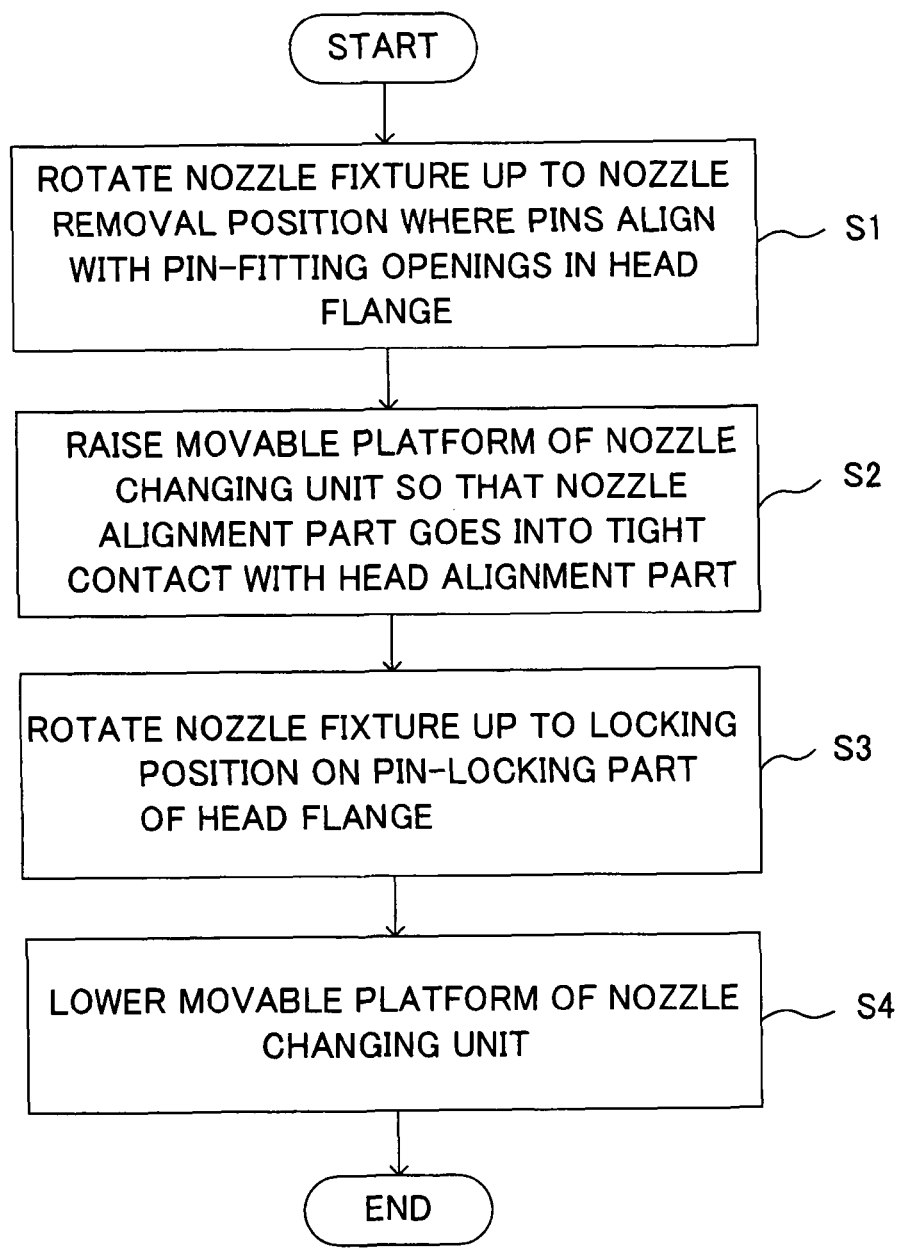
FIG. 16 is a flowchart showing a procedure to be followed when fitting the nozzle to the machining head element by using the nozzle changer of FIG. 14.
Figure 17:
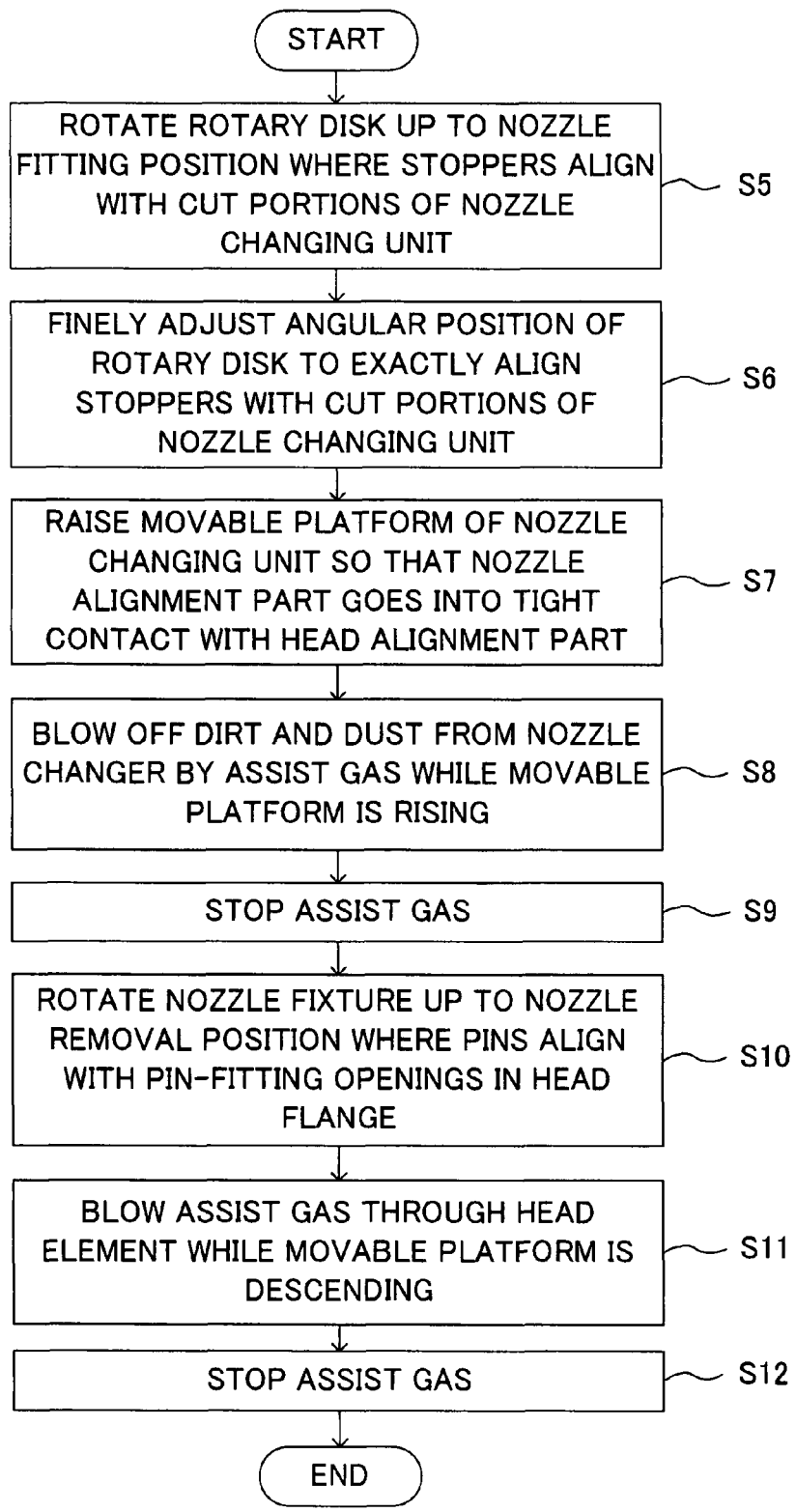
FIG. 17 is a flowchart showing a procedure to be followed when removing the nozzle from the machining head element by using the nozzle changer of FIG. 14.
Figure 19:
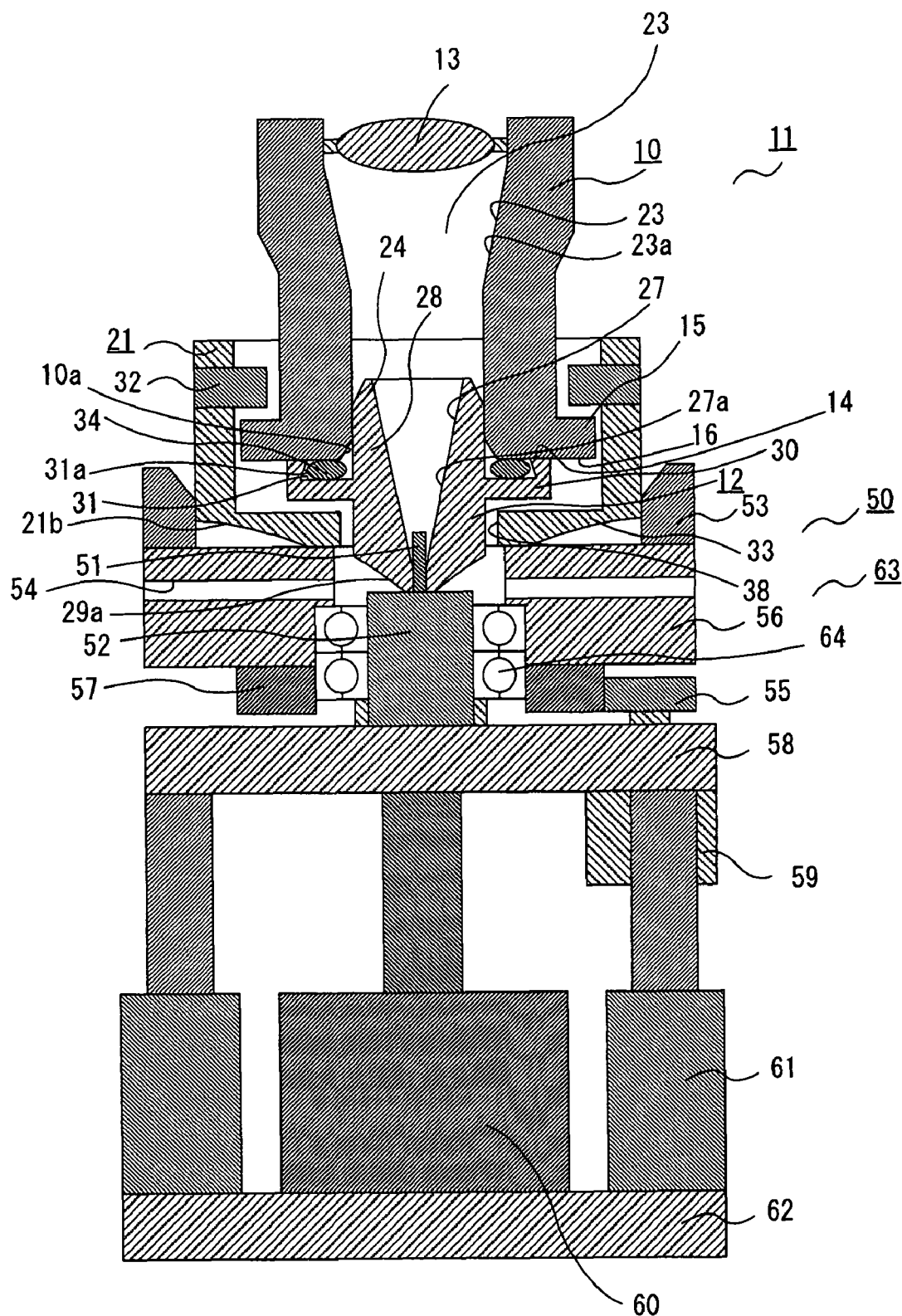
FIG. 19 is a cross-sectional diagram showing another specific step in the nozzle fitting process performed by the nozzle changer of FIG. 14.
Figure 20:
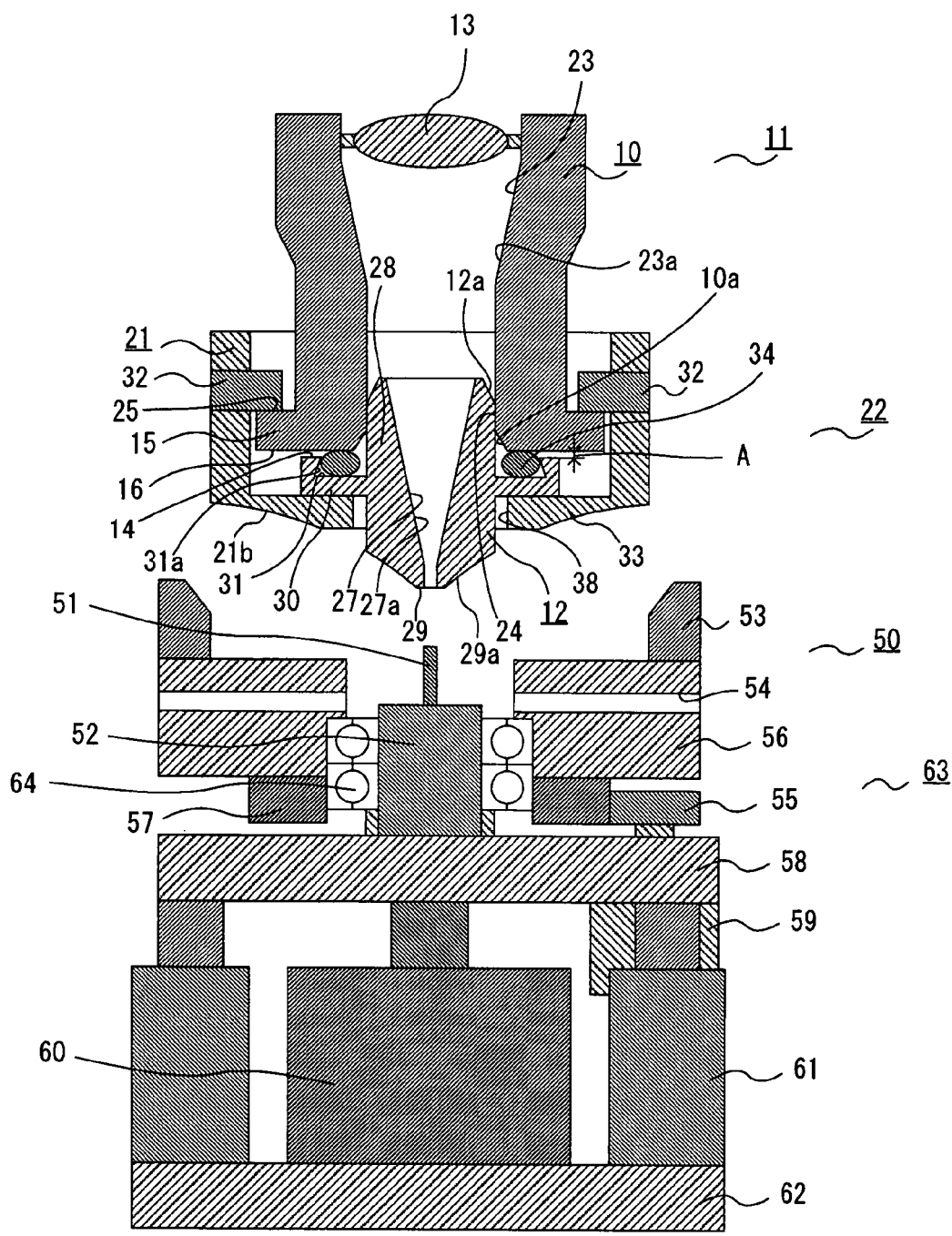
FIG. 20 is a cross-sectional diagram showing still another specific step in the nozzle fitting process performed by the nozzle changer of FIG. 14.
Figure 21:
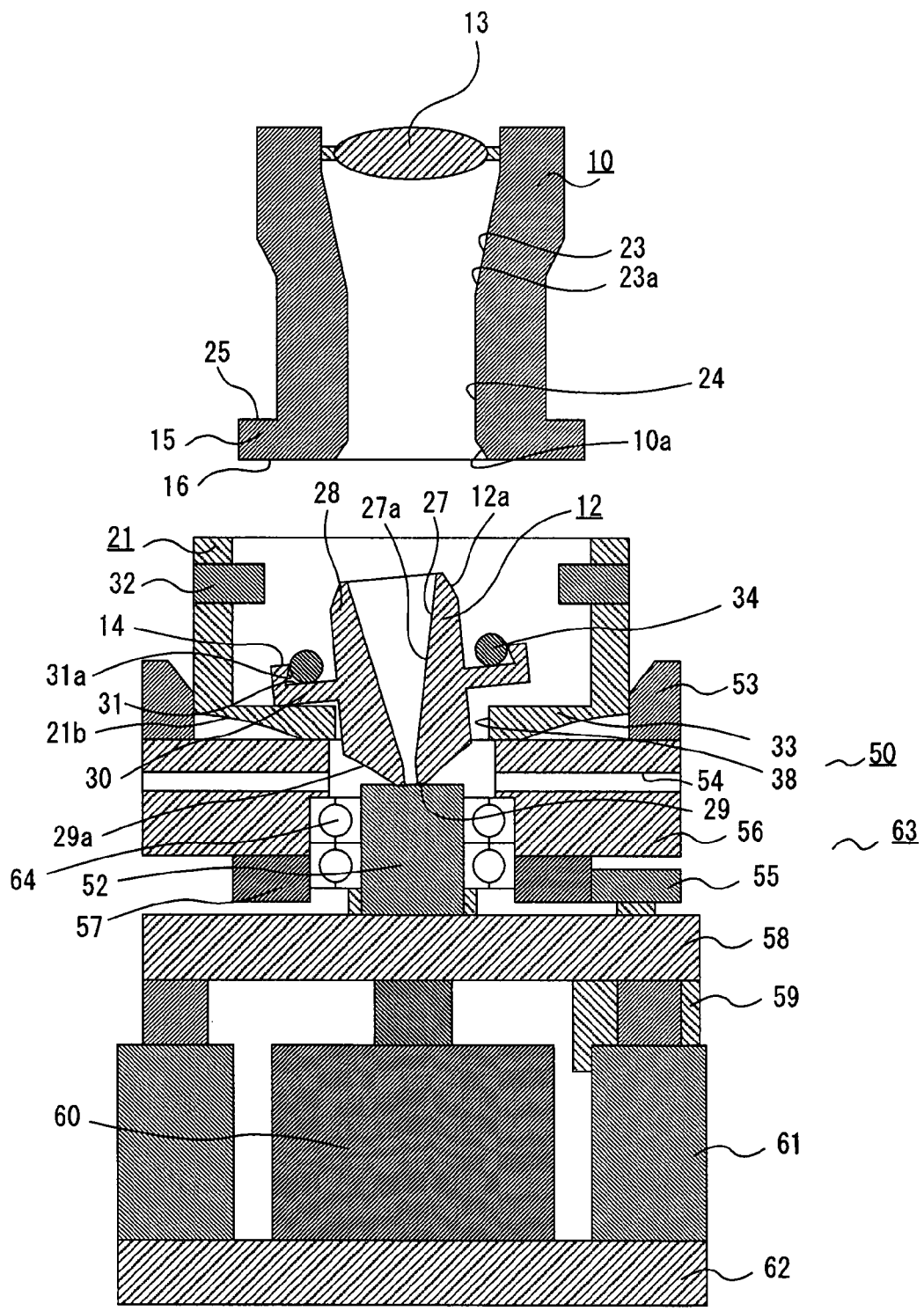
FIG. 21 is a cross-sectional diagram showing a problem which can occur if the nozzle changer is not provided with a nozzle supporting rod shown in FIG. 14.
Figure 22:
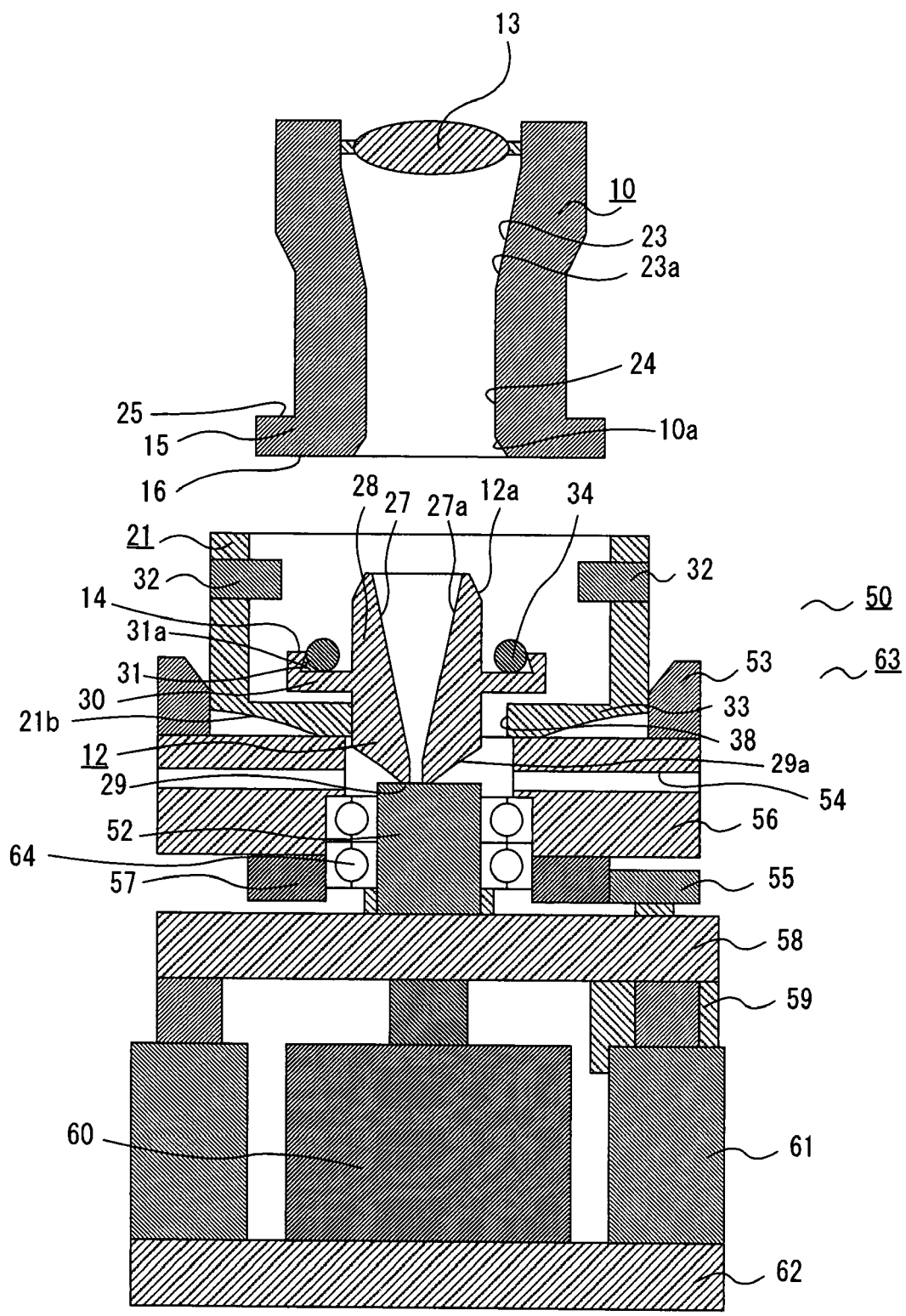
FIG. 22 is a cross-sectional diagram showing another problem which can occur if the nozzle changer is not provided with the nozzle supporting rod shown in FIG. 14.
Figure 23:
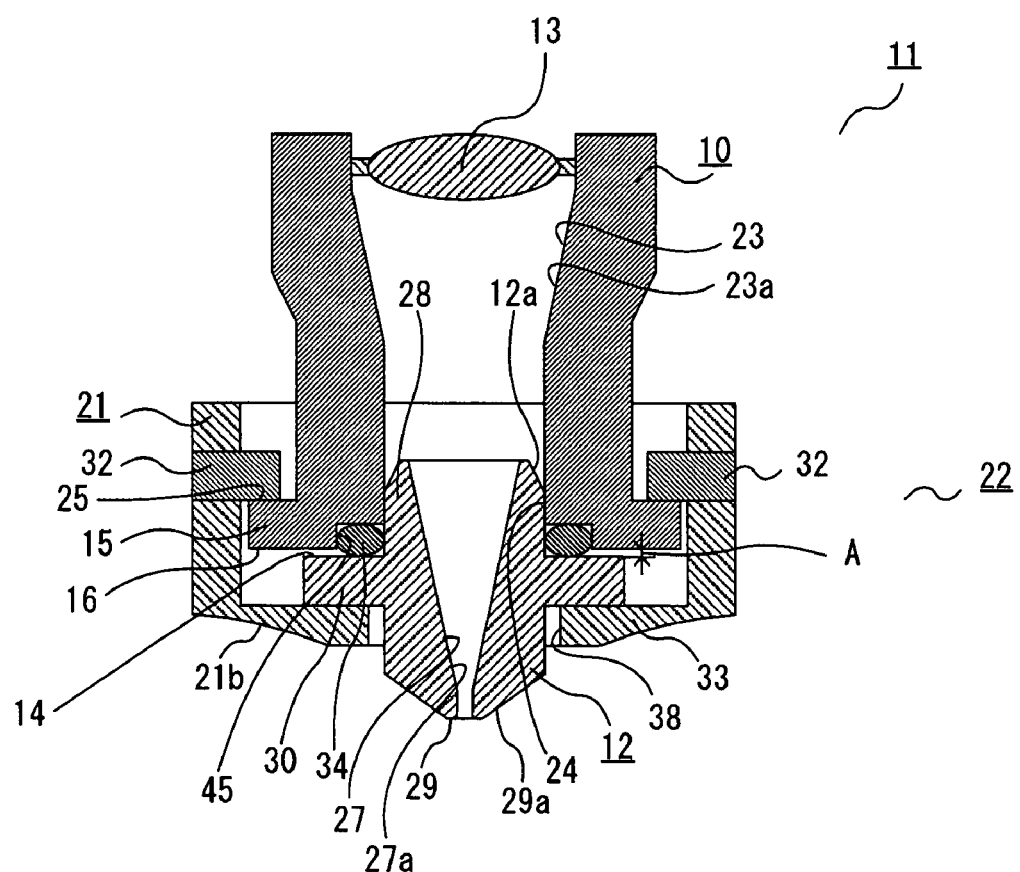
FIG. 23 is a cross-sectional view showing the structure of a machining head according to one variation of the first embodiment of the invention.
Figure 24A:
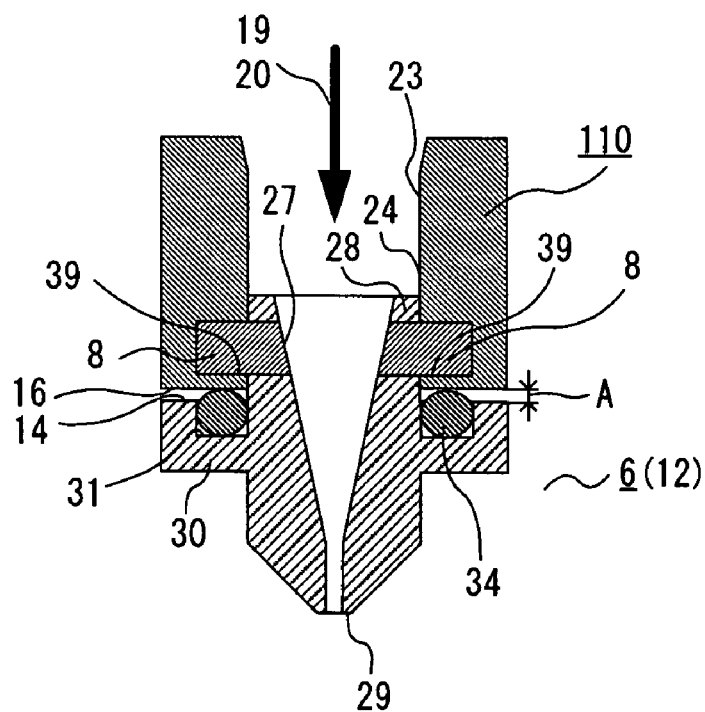
FIGS. 24A and 24B are cross-sectional and perspective views showing the structure of a machining head according to another variation of the first embodiment of the invention.
Figure 24B:
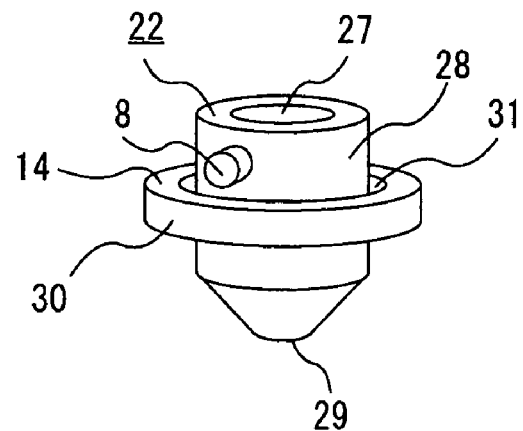
Figure 25A:
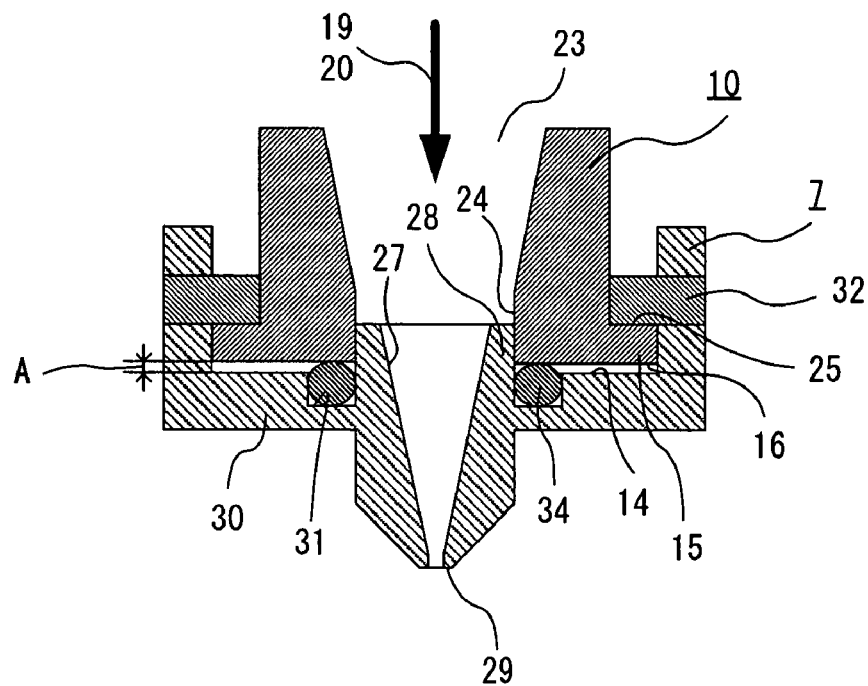
FIGS. 25A and 25B are cross-sectional and perspective views showing the structure of a machining head according to still another variation of the first embodiment of the invention.
Figure 25B:
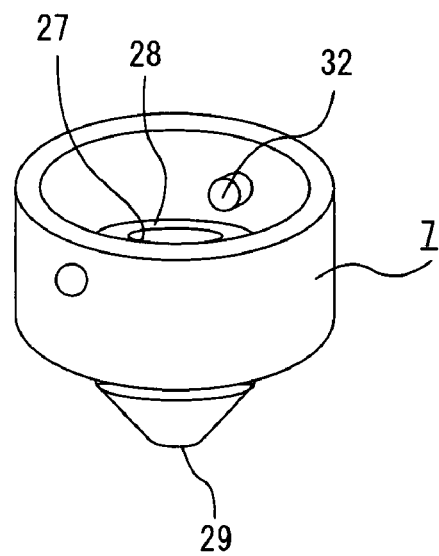

FIG. 1 is a perspective view showing the structure of a machining head 11 according to a first embodiment of the invention, FIG. 2 is a cross-sectional view of the machining head 11 of FIG. 1, FIG. 3 is a perspective view of a machining head element 10 of the machining head 11 of FIG. 1, FIG. 4 is a perspective view of a nozzle element 12 of a nozzle 22 of the machining head 11 of FIG. 1, FIGS. 5A and 5B are perspective and top views of a nozzle fixture 21 of the nozzle 22 of the machining head 11 of FIG. 1, FIG. 6 is a diagram schematically showing the structure of a laser beam machining apparatus 1 employing the machining head 11 shown in FIG. 1, FIGS. 7A, 7B, 8A and 8B are diagrams for explaining potential problems which may occur in the machining head 11 of the laser beam machining apparatus 1, FIG. 9 is a cross-sectional diagram for explaining vertical dimensional accuracy of the machining head 11 shown in FIG. 1, FIGS. 10A, 10B, 10C, 11A and 11B are cross-sectional diagrams for explaining how the machining head 11 of FIG. 1 works in controlling assist gas flows, FIGS. 12A, 12B, 13A and 13B are cross-sectional diagrams for explaining how the O-ring 34 (elastic member) of the machining head 11 of FIG. 1 works, FIG. 14 is a perspective view of the nozzle changer 50 for replacing the machining head of the machining head 11 shown in FIG. 1, FIG. 15 is a cross-sectional diagram showing the structure of the nozzle changer 50 of FIG. 14, FIG. 16 is a flowchart showing a procedure to be followed when fitting the nozzle 22 to the machining head element 10 by using the nozzle changer 50 of FIG. 14, FIG. 17 is a flowchart showing a procedure to be followed when removing the nozzle 22 from the machining head element 10 by using the nozzle changer 50 of FIG. 14, FIGS. 18 to 20 are cross-sectional diagrams showing specific steps in a process of nozzle fitting performed by the nozzle changer 50 of FIG. 14, FIGS. 21 and 22 are cross-sectional diagrams showing problems which can occur in the nozzle fitting process if the nozzle changer 50 is not provided with a nozzle supporting rod 51 shown in FIG. 14, FIG. 23 is a cross-sectional view of a machining head according to one variation of the first embodiment of the invention, FIGS. 24A and 24B are cross-sectional and perspective views of a machining head according to another variation of the first embodiment of the invention, and FIGS. 25A and 25B are cross-sectional and perspective views of a machining head according to still another variation of the first embodiment of the invention.

As shown in these Figures, the machining head 11 of the first embodiment includes the machining head element 10 and the nozzle 22 which is structured separately from the machining head element 10. Within the machining head element 10, there is formed an inner-head channel 23 which serves as a passageway for laser light 19 and assist gas 20. Provided upstream of the inner-head channel 23 is a focusing lens 13 for focusing the laser light 19 on a work 18. As used in this Specification, the expression "upstream" refers to an entrance side, or a direction from which the laser light 19 enters the machining head element 10, whereas the expression "downstream" refers to an exit side, or a direction facing the work 18. Illustration of the focusing lens 13 is provided in cross-sectional views only and is basically omitted in other drawings. The inner-head channel 23 is surrounded by an inside wall surface of the machining head element 10 that is streamlined as much as possible with minimal surface irregularities and shaped to form a generally cylindrical sloping surface 23a so that the inside diameter of the inner-head channel 23 gradually decreases downstream. The machining head element 10 has a joint portion 24 formed at a downstream end of the inner-head channel 23. As will be later discussed in detail, an upstream end 28 of the nozzle element 12 is fitted into the joint portion 24 of the machining head element 10. The machining head element 10 further has a head flange 15 extending radially outward from outside a downstream end portion of the machining head element 10.

In the head flange 15, there is formed a pair of radial pin-fitting openings 26 through which pins 32 are passed as will be later discussed. The two radial pin-fitting openings 26 are located at 180-degrees interval on a curved outer surface of a side wall of the machining head element 10, each of the pin-fitting openings 26 being made of a slant surface 26a on one side and a vertical surface 26b on the opposite side as shown in FIG. 3 to permit easy fitting and removal of the pins 32. A bottom side of the head flange 15 (i.e., a nozzle-side end surface of the machining head element 10) serves as a head alignment part 16, and a top side of the head flange 15 serves as a pin-locking part 25 which goes into contact with the pins 32 and thereby locks the nozzle fixture 21 in position. A curved inner surface of the machining head element 10 is beveled at the downstream end portion to form a sloping surface 10a so that the inside diameter of the inner-head channel 23 progressively increases downstream at an extreme downstream end thereof. The head flange 15 may be formed either as an integral part of the machining head element 10 or as a separate part and fixed onto the downstream end portion of the machining head element 10. In a case where the head flange 15 is formed as a separate part, the machining head element 10 and the head flange 15 should preferably be made of stainless steel and aluminum, for example, respectively.

The nozzle 22 includes the nozzle element 12 and the nozzle fixture 21 which is made separately from the nozzle element 12. Within the nozzle element 12, there is formed an inner-nozzle channel 27 which connects to the aforementioned inner-head channel 23. The inner-nozzle channel 27 is surrounded by an inside wall surface of the nozzle element 12 that is streamlined as much as possible with minimal surface irregularities and shaped to form a generally cylindrical sloping surface 27a so that the inside diameter of the inner-nozzle channel 27 gradually decreases downstream. The inside wall surfaces of the nozzle element 12 and the machining head element 10 are so shaped as to provide continuity between the generally cylindrical sloping surface 27a of the inner-nozzle channel 27 and the generally cylindrical sloping surface 23a of the inner-head channel 23 in terms of taper angle. At an extreme downstream end of the nozzle element 12, there is formed a nozzle orifice 29 which serves to direct both the laser light 19 and the assist gas 20 toward the work 18. The nozzle orifice 29 formed in a downstream end portion of the nozzle element 12 is surrounded by a curved surface 29a forming a generally conical shape whose outside diameter progressively decreases downstream. The nozzle element 12 further has a nozzle flange 30 extending radially outward from a curved outer surface of the nozzle element 12. In an upstream side of the nozzle flange 30 facing the machining head element 10, there is formed an annular groove 31 in which an O-ring 34 serving as an elastic member is fitted. A curved inside surface of an outer wall of the annular groove 31 forms a sloping surface 31a so that the inside diameter of the outer wall of the annular groove 31 gradually increases downstream.

A topmost surface of the nozzle flange 30 constitutes a nozzle alignment part 14 which is positioned face to face with the head alignment part 16. Provided with the aforementioned pins 32, the nozzle fixture 21 has a generally tubular structure whose downstream end portion is shaped to form a nozzle supporting part 33. The nozzle element 12 is secured in position as the nozzle flange 30 of the nozzle element 12 is seated on the nozzle supporting part 33 of the nozzle fixture 21 with a bottom side of the nozzle flange 30 held in close contact with the nozzle supporting part 33. There is formed a hole 38 in the nozzle supporting part 33 of the nozzle fixture 21, and the nozzle element 12 is positioned such that the downstream end portion thereof in which the nozzle orifice 29 is formed protrudes downward through this hole 38. The two pins 32 are formed to protrude radially inward from a curved inner surface of a generally cylindrical side wall of the nozzle fixture 21 at 180-degrees interval as shown in FIGS. 5A and 5B, the pins 32 being located above the nozzle supporting part 33 of the nozzle fixture 21. An outside surface of a downstream end portion of the nozzle fixture 21 forms a curved surface 21b which is shaped into a generally conical shape whose outside diameter progressively decreases downstream. The curved surface 21b of the nozzle fixture 21 and the aforementioned curved surface 29a of the nozzle element 12 are so shaped as to provide continuity in terms of contour lines as seen in cross section. The upstream end 28 of the nozzle element 12 opposite to the downstream end thereof where the nozzle orifice 29 is formed is fitted into and joined to the joint portion 24 of the machining head element 10 formed at the downstream end of the inner-head channel 23.

In the machining head 11 of the first embodiment thus structured, an optical axis of the laser light 19 is aligned with a central axis of the machining head 11. As the assist gas 20 is ejected through the nozzle 22, a flow of the ejected assist gas 20 is formed on a central axis of the nozzle 22. This means that the degree of alignment of the axes of the machining head 11 (or the machining head element 10) and the nozzle 22, or concentricity thereof, determines how exactly the flow direction of the ejected assist gas 20 is matched with the optical axis of the laser light 19. In this embodiment, the upstream end 28 of the nozzle element 12 is fitted into the joint portion 24 of the machining head element 10 so that the machining head element 10 and the nozzle 22 can be reassembled with a high degree of concentricity therebetween and, thus, the flow direction of the ejected assist gas 20 aligns with the optical axis of the laser light 19 with high accuracy.

If required laser machining accuracy is 0.1 mm, for example, the machining head element 10 and the nozzle 22 must be aligned to a concentricity of 0.05 mm. As the laser light 19 has a wavelength of 0.01 mm, it is possible to create a clearance of 0.01 mm to 0.05 mm between a curved inner surface of the joint portion 24 of the machining head element 10 and a curved outer surface of the upstream end 28 of the nozzle fixture 21 so that the upstream end 28 of the nozzle fixture 21 can be fitted into the joint portion 24 of the machining head element 10. The curved outer surface of the upstream end 28 of the nozzle fixture 21 is beveled to form a sloping surface 12a so that the outside diameter of the upstream end 28 of the nozzle fixture 21 progressively increases downstream. The O-ring 34 having a generally ringlike shape is fitted into the annular groove 31 formed in the nozzle flange 30 as mentioned earlier. Placed between the head alignment part 16 of the machining head element 10 and the nozzle alignment part 14 of the nozzle element 12, the O-ring 34 creates a clearance A therebetween as illustrated in FIG. 2. The O-ring 34 thus positioned serves as a seal element for preventing gas leakage from between the machining head element 10 and the nozzle element 12. While the machining head 11 of the present embodiment employs the ring-like (circle-shaped) O-ring 34 to seal off the assist gas 20 as depicted in the drawings, the seal element need not necessarily be circle-shaped but may be odd-shaped, such as square- or rectangular-shaped, as long as the seal element has a closed shape with no endpoints and can seal off gas leakage from between the machining head element 10 and the nozzle element 12. In this case, it is needless to say that the annular groove 31 formed in the nozzle flange 30 should be reshaped to accommodate such an odd-shaped seal element.

Referring to FIG. 6, the laser beam machining apparatus 1 employing the machining head 11 includes a laser oscillation unit 5 for producing the laser light 19 which is redirected by a reflecting mirror 9 and led into the machining head element 10 through the aforementioned focusing lens 13, an assist gas supply unit 17 for supplying the assist gas 20 into the machining head element 10, an XY stage 3 which serves as a platform on which the work 18 is placed in a horizontal position for machining, and a clamp 2 for securely holding the work 18 on the XY stage 3. A nozzle changer 50, which will be later described in detail, is also mounted on the XY stage 3 in an area separate from the work 18. The XY stage 3 is made movable in x- and y-axis directions in a horizontal plane so that the position of a specified point of the XY stage 3 can be adjusted to coincide with the location of the machining head element 10 as seen vertically down in plan view. The XY stage 3 of this embodiment constitutes a moving device mentioned in the appended claims. With the provision of this horizontally movable XY stage 3, it is possible to move the nozzle changer 50 to a location just below the machining head element 10. It is to be noted that the moving device of the invention is not limited to the above-described arrangement of the present embodiment. For example, the moving device may be an arrangement for simply moving the machining head element 10. This alternative arrangement should allow the machining head element 10 to move in both the x- and y-axis directions so that the machining head element 10 can be positioned just above the nozzle changer 50. Still alternatively, the moving device may be an arrangement for otherwise moving the XY stage 3 and the machining head element 10 relative to each other in the x- and y-axis directions.

As shown in FIG. 14, the nozzle changer 50 includes the aforementioned supporting rod 51 and a nozzle changing unit 63. The nozzle supporting rod 51 is fitted into the nozzle orifice 29 of the nozzle 22 and thereby supports the nozzle 22. The nozzle changing unit 63 works as described below during the nozzle fitting process, for instance. In the beginning of the nozzle fitting process, the nozzle 22 is placed on the nozzle changer 50 with the nozzle supporting rod 51 fitted in the nozzle orifice 29 of the nozzle element 12 and, then, the machining head element 10 is fitted on the nozzle element 12 with the O-ring 34 placed in between. The nozzle changing unit 63 forces the machining head element 10 and the nozzle element 12 against each other, thereby deforming the O-ring 34, so that the nozzle alignment part 14 of the nozzle element 12 goes into direct contact with the head alignment part 16 of the machining head element 10 and the bottom side of the nozzle flange 30 is separated from the nozzle supporting part 33 of the nozzle fixture 21 (FIG. 19). Under this condition, the nozzle changing unit 63 rotates only the nozzle fixture 21 so that the pins 32 of the nozzle fixture 21 passed through the respective pin-fitting openings 26 formed in the head flange 15 lie on the pin-locking part 25 of the machining head element 10 and, then, releases a pushing force exerted on the machining head element 10 and the nozzle element 12 so that the O-ring 34 resumes a normal shape thereof, creating the aforementioned clearance A between the head alignment part 16 and the nozzle alignment part 14 (FIG. 20). When removing the nozzle 22, the nozzle changing unit 63 forces the nozzle element 12 upward tight against the machining head element 10, thus creating a clearance between the nozzle element 12 and the nozzle fixture 21, and then rotates only the nozzle fixture 21 so that the pins 32 of the nozzle fixture 21 pass through the respective pin-fitting openings 26 in the head flange 15.

Figure 18:
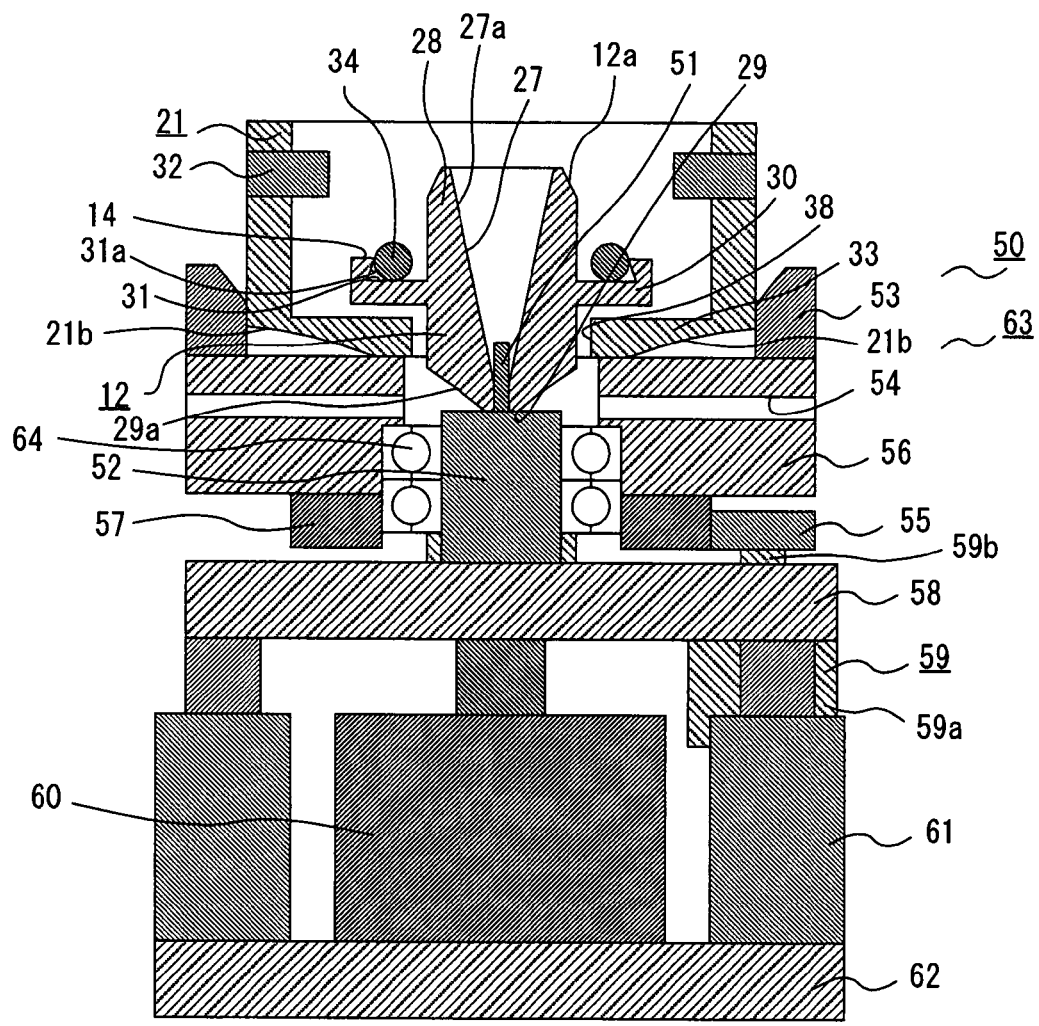
FIG. 18 is a cross-sectional diagram showing a specific step in a process of nozzle fitting performed by the nozzle changer of FIG. 14.

Referring to FIGS. 14 and 15, the aforementioned nozzle changing unit 63 includes a stationary base plate 62, a direct-acting actuator 60, a plurality of guides 61, a movable platform 58, a rotational driver 59, a primary rotating force transmitter 55, a secondary rotating force transmitter 57, a nozzle pusher 52, rotating means 64, a rotary disk 56, a plurality of stoppers 53 and gas release holes 54. The direct-acting actuator 60 and the guides 61 together fix the movable platform 58 to the stationary base plate 62. The rotational driver 59 which is affixed to the movable platform 58 includes a main body 59a and a drive shaft 59b which rotates relative to the main body 59a (FIG. 18). The primary rotating force transmitter 55 is fixed to the drive shaft 59b of the rotational driver 59. The nozzle pusher 52 is affixed to the movable platform 58 and provided with the nozzle supporting rod 51 on a top surface. The rotating means 64 is mounted around the nozzle pusher 52, and the rotary disk 56 and the secondary rotating force transmitter 57 are mounted around the rotating means 64 on a common axis, the rotary disk 56 and the secondary rotating force transmitter 57 being fixedly joined to each other. The primary rotating force transmitter 55 is in mesh with the secondary rotating force transmitter 57. The gas release holes 54 which are formed in the rotary disk 56 serve to prevent vibrations potentially caused by oscillatory motion of the stoppers 53 and assist gas flows.

Now, operation of the nozzle changer 50 for replacing the nozzle 22 of the machining head 11 of the laser beam machining apparatus 1 is discussed in detail with reference to the working of the individual components of the nozzle changer 50. The direct-acting actuator 60, when activated, causes the movable platform 58 to move along a z-axis direction (vertical direction) in a motion guided by the guides 61. The rotational driver 59, the primary rotating force transmitter 55 and other mechanisms mounted on the movable platform 58 move up and down together with the movable platform 58. The secondary rotating force transmitter 57, the rotary disk 56 and the stoppers 53 are caused to rotate together around the nozzle pusher 52 via the rotating means 64. As the drive shaft 59b of the rotational driver 59 rotates, the primary rotating force transmitter 55 fixed to the drive shaft 59b rotates together and the secondary rotating force transmitter 57 engaged with the primary rotating force transmitter 55 turns around the nozzle pusher 52. Since the rotary disk 56 and the secondary rotating force transmitter 57 are fixed to each other, the rotary disk 56 rotates when the secondary rotating force transmitter 57 rotates. Briefly, the rotary disk 56 turns around the nozzle pusher 52 when the drive shaft 59b of the rotational driver 59 rotates. The nozzle pusher 52 does not rotate in this condition because the rotating means 64 exists between the combination of the rotary disk 56 and the secondary rotating force transmitter 57 and the nozzle pusher 52.

Described below with reference to the flowchart of FIG. 16 is how the nozzle 22 is fitted to the machining head element 10 by use of the nozzle changer 50. In preparation for the fitting of the nozzle 22, the O-ring 34 is fitted into the annular groove 31 formed in the nozzle flange 30 and the nozzle fixture 21 is placed on the inside of the stoppers 53 of the nozzle changing unit 63 so that cut portions 21a of the nozzle fixture 21 (refer to FIGS. 5A and 5B) are positioned in contact with opposite two of the stoppers 53. Then, the nozzle element 12 is placed in the nozzle fixture 21 such that the nozzle supporting rod 51 at the top of the nozzle pusher 52 fits into the nozzle orifice 29 of the nozzle element 12 as shown in FIG. 18. If the nozzle pusher 52 is not provided with the nozzle supporting rod 51, the nozzle element 12 may lean as shown in FIG. 21, potentially causing misalignment of central axes of the nozzle element 12 and the machining head element 10 and inability to fit the upstream end 28 of the nozzle element 12 into the joint portion 24 of the machining head element 10 in the nozzle fitting process. Even if the nozzle element 12 could be placed on the nozzle pusher 52 in an upright position, the nozzle element 12 may be offset sideways from a central axis of the nozzle pusher 52 as shown in FIG. 22, resulting in potential inability to fit the upstream end 28 of the nozzle element 12 into the joint portion 24 of the machining head element 10 in the nozzle fitting process.

Proceeding to step S1 of FIG. 16, the nozzle changing unit 63 brings (rotates) the nozzle fixture 21 to a nozzle removal position which refers to an angular position of the nozzle fixture 21 where the nozzle changing unit 63 removes the nozzle fixture 21 from the machining head element 10, that is, the position where the pins 32 of the nozzle fixture 21 align with the pin-fitting openings 26 in the head flange 15 of the machining head element 10. Then, the moving device adjusts relative positions of the machining head element 10 and the nozzle changer 50 in the x- and y-axis directions so that the central axis of the nozzle pusher 52 aligns with the central axis of the machining head element 10 and the head alignment part 16 of the machining head element 10 would exactly be positioned face to face with the nozzle alignment part 14 of the nozzle flange 30. More specifically, the XY stage 3 (moving device) of the laser beam machining apparatus 1 moves the nozzle changer 50 to a nozzle replacement position where the nozzle changer 50 is located exactly below the machining head element 10 so that the central axis of the nozzle pusher 52 aligns with that of the machining head element 10.

After the laser beam machining apparatus 1 has been set to the nozzle replacement position and the nozzle pusher 52 has been aligned with the machining head element 10, the direct-acting actuator 60 of the nozzle changing unit 63 is activated to raise the movable platform 58 and thereby move the nozzle 22 upward, so that the upstream end 28 of the nozzle element 12 is fitted into the joint portion 24 of the machining head element 10. As the movable platform 58 moves upward, the nozzle flange 30 of the nozzle element 12 forces the O-ring 34 against the downstream end of the machining head element 10 so that the O-ring 34 deforms until the nozzle alignment part 14 of the nozzle flange 30 goes into tight contact with the head alignment part 16 of the machining head element 10 and, as a consequence, the pins 32 of the nozzle fixture 21 pass through the respective pin-fitting openings 26 formed in the head flange 15 and positioned above the head flange 15 as shown in FIG. 19. Since the upstream end 28 of the nozzle element 12 is fitted into the joint portion 24 of the machining head element 10 at this point, the machining head element 10 and the nozzle 22 can be reassembled with a high degree of concentricity therebetween and, thus, the flow direction of the assist gas 20 aligns with the optical axis of the laser light 19 with high accuracy (step S2 of FIG. 16). Subsequently, the nozzle changing unit 63 brings (rotates) the nozzle fixture 21 to a locking position where the pins 32 of the nozzle fixture 21 rest on the pin-locking part 25 of the machining head element 10. In other words, the pins 32 which have passed upward through the pin-fitting openings 26 in the head flange 15 are moved onto the pin-locking part 25 and become locked thereon. More specifically, the rotational driver 59 of the nozzle changing unit 63 is activated to rotate the nozzle fixture 21 together with the rotating means 64 so that the nozzle fixture 21 is brought to the locking position (step S3 of FIG. 16). Finally, the direct-acting actuator 60 lowers the movable platform 58 so that the nozzle element 12 slightly descends. Consequently, the pushing force exerted on the O-ring 34 is released so that the O-ring 34 resumes the normal shape and the aforementioned clearance A is created between the head alignment part 16 and the nozzle alignment part 14 as shown in FIG. 20 (step S4 of FIG. 16). The nozzle element 12 of the nozzle 22 can be fitted to the machining head element 10 by the above-described nozzle fitting procedure.

Described below with reference to the flowchart of FIG. 17 is how the nozzle 22 is removed from the machining head element 10 by use of the nozzle changer 50. First, the moving device adjusts the relative positions of the machining head element 10 of the machining head 11 and the nozzle changer 50 in the x- and y-axis directions. More specifically, the XY stage 3 (moving device) of the laser beam machining apparatus 1 moves the nozzle changer 50 to a nozzle replacement position where the nozzle changer 50 is located exactly below the machining head 11 with the central axis of the machining head 11 aligned with the central axis of the nozzle pusher 52 as shown in FIG. 20.

Proceeding to step S5 of FIG. 17, the nozzle changing unit 63 brings (rotates) the rotary disk 56 to a nozzle fitting position which refers to an angular position of the rotary disk 56 where opposite two of the stoppers 53 align with the cut portions 21a of the nozzle fixture 21. Even when there is an angular displacement between the stoppers 53 and the nozzle fixture 21, the rotational driver 59 produces a torque (rotational driving force) for fine-adjusting the angular position of the rotary disk 56 so that the stoppers 53 align with the cut portions 21a of the nozzle fixture 21 (step S6 of FIG. 17). Then, the machining head 11 is lowered so that the nozzle supporting rod 51 fits into the nozzle orifice 29 of the nozzle element 12. To release the nozzle element 12 from the nozzle fixture 21, the direct-acting actuator 60 of the nozzle changing unit 63 is activated to raise the movable platform 58 and thereby move the nozzle 22 upward. As the movable platform 58 moves upward, the nozzle flange 30 of the nozzle element 12 forces the O-ring 34 against the downstream end of the machining head element 10 so that the O-ring 34 deforms until the nozzle alignment part 14 of the nozzle flange 30 goes into tight contact with the head alignment part 16 of the machining head element 10 (step S7 of FIG. 17). While the movable platform 58 is moving the nozzle element 12 upward, the assist gas 20 is fed into the machining head 11 so that the assist gas 20 ejected through the nozzle orifice 29 would blow off any dirt and dust from the nozzle changer 50 (step S8 of FIG. 17). The assist gas 20 thus blown into the nozzle changer 50 is discharged through the gas release holes 54 and other openings in the nozzle changer 50 to the exterior. During this gas blowing process, the gas release holes 54 serve to prevent vibrations of the nozzle changing unit 63 potentially caused by pressure of the assist gas 20. Subsequently, the laser beam machining apparatus 1 stops feeding the assist gas 20 (step S9 of FIG. 17).

When the movable platform 58 has fully ascended, the rotational driver 59 of the nozzle changing unit 63 is activated to rotate the nozzle fixture 21 together with the rotating means 64 so that the nozzle fixture 21 is brought to the nozzle removal position where the pins 32 of the nozzle fixture 21 align with the pin-fitting openings 26 in the head flange 15 of the machining head element 10 (step S10 of FIG. 17). Then, the direct-acting actuator 60 lowers the movable platform 58 so that the nozzle element 12 slightly descends. Consequently, the pushing force exerted on the O-ring 34 is released so that the O-ring 34 resumes the normal shape and a clearance is created between the head alignment part 16 and the nozzle alignment part 14 as shown in FIG. 20. The clearance created between the head alignment part 16 and the nozzle alignment part 14 in this nozzle removal process is equal to or larger than the clearance A created in the aforementioned nozzle fitting process. Since the pins 32 of the nozzle fixture 21 are aligned with the pin-fitting openings 26 in the head flange 15 at this point, the pins 32 pass downward through the pin-fitting openings 26 and the nozzle fixture 21 carrying the nozzle element 12 comes off the machining head element 10 as the movable platform 58 of the nozzle changing unit 63 lowers. While the nozzle fixture 21 is descending, the laser beam machining apparatus 1 again feeds the assist gas 20 into the machining head element 10 so that the assist gas 20 is ejected downstream through the inner-head channel 23 of the machining head element 10 and into the nozzle changer 50 (step S11 of FIG. 17). The assist gas 20 ejected through the inner-head channel 23 first hits against the O-ring 34 in the annular groove 31 of the nozzle element 12, serving thereby to separate the O-ring 34 from the machining head element 10 to which the O-ring 34 securely adheres. The assist gas 20 thus blown into the nozzle changer 50 is discharged through the gas release holes 54 and the other openings in the nozzle changer 50 to the exterior. Finally, the laser beam machining apparatus 1 stops feeding the assist gas 20 (step S12 of FIG. 17). The nozzle 22 can be removed from the machining head element 10 by the above-described nozzle removal procedure.

If friction occurs between the nozzle element 12 and the nozzle fixture 21 during the nozzle fitting or removal process, part of the nozzle element 12 and/or the nozzle fixture 21 will wear out. The location of this worn part is critical because it determines a positional relationship between the nozzle orifice 29 of the nozzle element 12 and a focal point of the laser light 19. This means that if the nozzle element 12 and the nozzle fixture 21 are moved along each other in frictional motion and one or both of them wear out, there arises a possibility that a change in the positional relationship between the nozzle orifice 29 and the focal point of the laser light 19 takes place. For example, a change in the distance between the nozzle orifice 29 and the focal point of the laser light 19 may potentially results in deterioration of machining quality as will be later discussed in detail. During either of the above-described nozzle fitting and removal processes, the O-ring 34 is compressed so that the O-ring 34 deforms until the nozzle alignment part 14 of the nozzle flange 30 goes into tight contact with the head alignment part 16 of the machining head element 10 and, as a consequence, the nozzle element 12 is not in touch with the nozzle fixture 21. Since only the nozzle fixture 21 is rotated in this condition to fit or remove the nozzle 22 to or from the machining head element 10, so that neither the nozzle element 12 nor the nozzle fixture 21 wears due to friction therebetween. Furthermore, the rotational driver 59 is not required to produce a large torque during the nozzle fitting or removal process. Also, since only the nozzle fixture 21 is rotated, the O-ring 34 is not caused to rub on any nearby component during the nozzle fitting or removal process. Consequently, the nozzle fitting and removal processes of the present embodiment serve to prolong the useful life of the O-ring 34. Moreover, due to the provision of the stoppers 53 on the rotary disk 56, the nozzle fixture 21 may be rotated to one of prescribed angular positions located at specific angular intervals, such as 90 degrees. This serves to eliminate the need to judge whether the nozzle fitting or removal process has been completed. Additionally, even if the nozzle fixture 21 is placed on the inside of the stoppers 53 with a slight deviation from a desired angular position, the rotational driver 59 produces the torque for fine-adjusting the angular position of the stoppers 53. It is therefore unnecessary to place the nozzle fixture 21 in the stoppers 53 at a strictly aligned angular position.

While FIG. 6 shows an example in which the laser beam machining apparatus 1 is provided with a single nozzle changer 50, the invention is not limited thereto. The laser beam machining apparatus 1 may be modified to include a plurality of nozzle changers so that the currently fitted nozzle 22 can be automatically replaced with an appropriate nozzle 22 selected from plural nozzles 22 depending on the type of laser machining operation to be performed next. Each of the plurality of nozzle changers provided on the laser beam machining apparatus for this purpose may include all of the aforementioned constituent elements of the nozzle changer 50 shown in FIG. 14. Alternatively, the plurality of nozzle changers may be provided with a single set of the stationary base plate 62, the direct-acting actuator 60, the guides 61 and the movable platform 58, which are shared by a plural sets of the rest of the constituent elements of the nozzle changer 50 of FIG. 14.

In practice, constituent elements of the machining head 11 and the nozzle changer 50, such as the machining head element 10, the nozzle element 12, the nozzle fixture 21 and the nozzle changing unit 63, are manufactured with some variations in machining accuracy. It is however essential for the direct-acting actuator 60 to ensure that the nozzle flange 30 is positioned in tight contact with the machining head element 10 in a reliable fashion regardless of the variations in the machining accuracy. If the direct-acting actuator 60 controls the height of the movable platform 58, and thus the height of the nozzle 22, by a position control approach in the nozzle fitting and removal processes, there can occur a positioning error, making it necessary to perform subsequent height adjustment. In the nozzle changer 50 of this embodiment, the direct-acting actuator 60 controls the height of the movable platform 58 (the nozzle 22) by a force control approach. Specifically, the direct-acting actuator 60 controllably lifts the movable platform 58 (the nozzle 22) up to a point where the O-ring 34 is compressed and the nozzle alignment part 14 of the nozzle flange 30 goes into close contact with the head alignment part 16 of the machining head element 10. In this nozzle lifting operation, the O-ring 34 helps control the height of the nozzle 22 regardless of the machining accuracy of the related constituent elements so that the nozzle alignment part 14 goes into close contact with the head alignment part 16 in a reliable fashion.

Now, the working of the laser beam machining apparatus 1 provided with the machining head 11 thus structured is described. The laser beam machining apparatus 1 is used for hot-cutting the work 18 gripped by the clamp 2 on the XY stage 3 by use of the laser light 19. The laser oscillation unit 5 of the laser beam machining apparatus 1 generates the laser light 19 by a process known as laser oscillation. The laser light 19 is reflected toward the machining head 11 by the reflecting mirror 9 and focused by the focusing lens 13 provided in the machining head 11, so that the work 18 is cut approximately at the focal point of the laser light 19. The assist gas supply unit 17 provided in the laser beam machining apparatus 1 pressurizes the assist gas 20. The pressurized assist gas 20 is ejected from the machining head 11 toward the work 18 to blow off debris, or molten material of the work 18, produced during laser cutting operation. The XY stage 3 (moving device) moves the work 18 in the x- and y-axis directions in the horizontal plane so that a specified part of the work 18 to be cut is located exactly below the machining head 11. Also, the height (vertical position) of the machining head 11 is adjusted by a z-axis servomotor (not shown) to optimize location of the focal point of the laser light 19 relative to the work 18. As previously mentioned, the moving device of the invention is not limited to the arrangement in which the XY stage 3 moves the work 18 in the horizontal plane but may be an arrangement for horizontally moving the machining head element 10 or an arrangement for otherwise moving the XY stage 3 and the machining head 11 relatively in the x- and y-axis directions.

Shown in FIG. 7A is an ideal state which will normally be observed during laser machining operation, in which the flow direction of the ejected assist gas 20 is matched with the optical axis of the laser light 19. While the work 18 is cut by heat of the laser light 19, the assist gas 20 blows off the molten material of the work 18 downward. If the concentricity between the machining head element 10 and the nozzle 22 is impaired, the flow direction of the ejected assist gas 20 will not exactly align with the optical axis of the laser light 19 as shown in FIG. 7B and, as a consequence, the assist gas 20 may hit against an undesired part of the work 18 or even against an inappropriate area beneath the work 18.

If the flow direction of the assist gas 20 is disturbed as mentioned above, the molten material of the work 18, which is blown off by the assist gas 20 in the ideal state of the laser machining operation, may adhere to the nozzle orifice 29, creating a buildup of debris 35 thereon, and the debris 35 thus created may damage the work 18 as a result of contact therewith. Another possibility that may arise from accumulation of the debris 35 on the work 18 is that the debris 35 adhering to the work 18 can only be removed unevenly, resulting in formation of a burr 36 or development of a flaw 37, such as a curved machined surface. If the distance between the nozzle orifice 29 and the work 18 is smaller than an ideal distance as shown in FIG. 8A, there arises a risk of damaging the work 18 or the nozzle element 12 as a result of direct contact therebetween. If the distance between the nozzle orifice 29 and the work 18 is larger than the ideal distance as shown in FIG. 8B on the contrary, a large quantity of the assist gas 20 would leak from between the nozzle 22 and the work 18, potentially causing inability to sufficiently remove the debris 35 from the work 18, as well as resultant formation of the burr 36 and deterioration of machining quality.

As will be recognized from the above discussion, the machining head 11 needs to be positioned at an optimal height from the work 18 with high accuracy. Discussed below is the vertical dimensional accuracy of the machining head 11 required in the present invention. The height of the machining head 11 is normally so adjusted that the focal point of the laser light 19 lies on a top surface of the work 18. Referring to FIG. 9, distance 44 between the nozzle orifice 29 at the downstream end of the nozzle element 12 and the top surface of the work 18 is obtained by subtracting distance 40 between the focusing lens 13 fitted in the machining head 11 and the pin-locking part 25 of the head flange 15, distance 41 between lower ends of the pins 32 of the nozzle fixture 21 and a top surface of the nozzle supporting part 33 thereof (or the bottom side of the nozzle flange 30), distance 42 between the bottom side of the nozzle flange 30 (or the top surface of the nozzle supporting part 33 of the nozzle fixture 21) and the nozzle orifice 29 at the downstream end of the nozzle element 12 from distance 43 between the focusing lens 13 and the focal point. The distance 43 between the focusing lens 13 and the focal point and the distance 40 between the focusing lens 13 and the pin-locking part 25 of the head flange 15 are predetermined and remain unchanged even when the nozzle 22 is replaced. Thus, the distance 44 between the nozzle orifice 29 at the downstream end of the nozzle element 12 and the top surface of the work 18 is determined by two parameters, that is, the distance 41 between the lower ends of the pins 32 and the top surface of the nozzle supporting part 33 (or the bottom side of the nozzle flange 30) and the distance 42 between the bottom side of the nozzle flange 30 (or the top surface of the nozzle supporting part 33 of the nozzle fixture 21) and the nozzle orifice 29 at the downstream end of the nozzle element 12.

When the number of constituent elements is not so large as in the machining head 11 of the first embodiment, the sum of the aforementioned distances 41 and 42 does not vary so much even when dimensional and positional variations of all these constituent elements are added together, so that variations which can occur in the distance 44 between the nozzle orifice 29 and the top surface of the work 18 is considerably small. An actual range of variations in this distance 44 is far smaller than a range of permissible errors in the distance 44 between the nozzle orifice 29 and the top surface of the work 18. Specifically, when the nozzle 22 including the nozzle element 12 and the nozzle fixture 21 is replaced with a different type, a variation in the distance 44 between the nozzle orifice 29 and the top surface of the work 18 must not exceed 0.6 mm for ensuring high-quality machining. Since there are only two constituent elements (i.e., the nozzle element 12 and the nozzle fixture 21) which affect the location of the focal point, each of the two constituent elements must be manufactured at least with a dimensional tolerance of 0.3 mm. This dimensional tolerance falls within range of an ordinarily required dimensional tolerances and is easily attainable. It is therefore possible reassemble the machining head 11 in such a manner that the distance 44 between the nozzle orifice 29 and the top surface of the work 18 becomes substantially equal to the aforementioned ideal distance. Since the nozzle 22 and the machining head element 10 are locked together by hooking the pins 32 of the nozzle fixture 21 onto the pin-locking part 25 of the head flange 15 in the above-described structure of the machining head 11, it is possible to create the ideal state of laser machining shown in FIG. 7A, and not undesirable states shown in FIGS. 8A and 8B, without the need to adjust vertical positioning of the nozzle 22 upon replacement thereof.

Discussed below is how many pins 32 should be provided to produce the aforementioned advantageous effects of the present invention. If the nozzle fixture 21 is provided with only one pin 32, there arises a possibility that the nozzle 22 tilts together with the nozzle fixture 21 due to pressure of the assist gas 20. In the foregoing discussion, it is assumed that each pin 32 is sufficiently thick and, thus, flexure of the pin 32 caused by the pressure of the assist gas 20 is negligible. For example, if the upstream end 28 of the nozzle element 12 has an outside diameter of 14.98 mm and the joint portion 24 of the machining head element 10 has an inside diameter of 15.02 mm, creating a clearance of 0.04 mm therebetween, a maximum tilt angle of the nozzle 22 is 4.18 degrees as calculated. Assuming that the work 18 to be machined is 25 mm thick, this tilt angle of the nozzle 22 causes the laser light 19 and the assist gas 20 to deviate 1.83 mm horizontally at the bottom surface of the work 18. This would impair the concentricity between the machining head element 10 and the nozzle 22 and lead to deterioration of machining quality. In order to prevent such degradation of the concentricity between the machining head element 10 and the nozzle 22 caused by the pressure of the assist gas 20, it is needed to reduce the clearance between the upstream end 28 of the nozzle element 12 and the joint portion 24 of the machining head element 10. This requires high accuracy in shapes of the constituent elements of the machining head 11, resulting in an increase in their manufacturing cost.

This problem associated with the above-described single-pin structure, in which the nozzle fixture 21 is provided with only one pin 32, can be easily overcome by providing the aforementioned two pins 32 which protrude radially inward from the generally cylindrical side wall of the nozzle fixture 21 at 180-degrees interval. The provision of the two pins 32 serves to prevent the nozzle fixture 21 and the nozzle 22 from tilting due to the pressure of the assist gas 20 and thus maintain the concentricity between the machining head element 10 and the nozzle 22 and a normal state of laser machining. This two-pin structure does not require high accuracy in shapes of the constituent elements of the machining head 11, making it possible to manufacture the constituent elements at low cost.

Discussed next is how thick the pins 32 should be. Assuming that the pressure of the assist gas 20 is 3 MPa, an area which receives the pressure of the assist gas 20 is equivalent to a circle 20 mm in diameter, and each pin 32 has a shear strength $\tau$ equal to 1000 MPa, there is a relationship expressed by $P=(\pi \times d^2/4) \times \tau$ between shear load P and diameter d of the pins 32. Since there are two pins 32, $(3 \times \pi \times 20^2/4)/2=(\pi \times d^2/4) \times 1000$, and thus, d=0.77 mm. It follows that each pin 32 should be 0.8 mm or more in diameter. It is recognized from the above discussion that readily available smallest-diameter (1.0 mm) pins are usable as the pin 32 of the nozzle fixture 21, yet providing a sufficient strength to withstand the pressure of the assist gas 20.

The nozzle 22 and the machining head element 10 are locked to each other by a combination of the two pins 32 which are diagonally located at 180-degrees interval and the O-ring 34 uniformly compressed all around between the machining head element 10 and the nozzle element 12. This structure of the invention ensures that the nozzle 22 is firmly affixed to the machining head element 10 without any risk of tilting or vibrating.

Figure 10A:
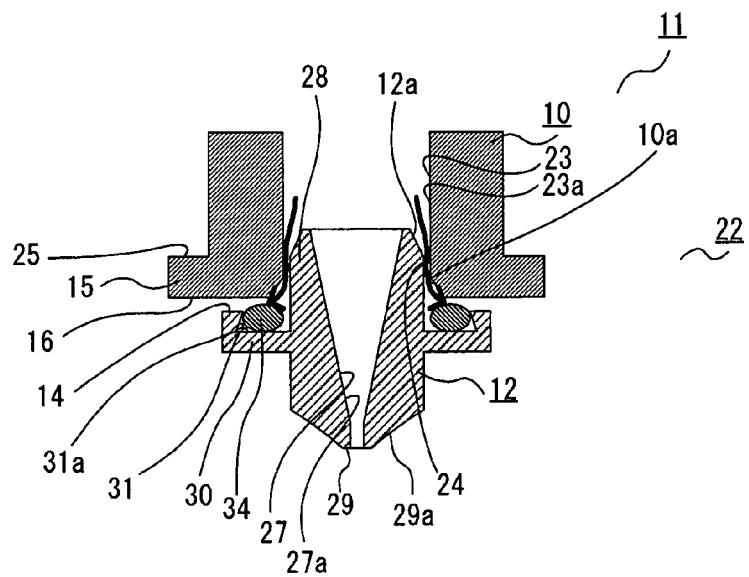
FIGS. 10A, 10B and 10C are cross-sectional diagrams showing how the machining head of FIG. 1 works in controlling assist gas flows.
Figure 10B:
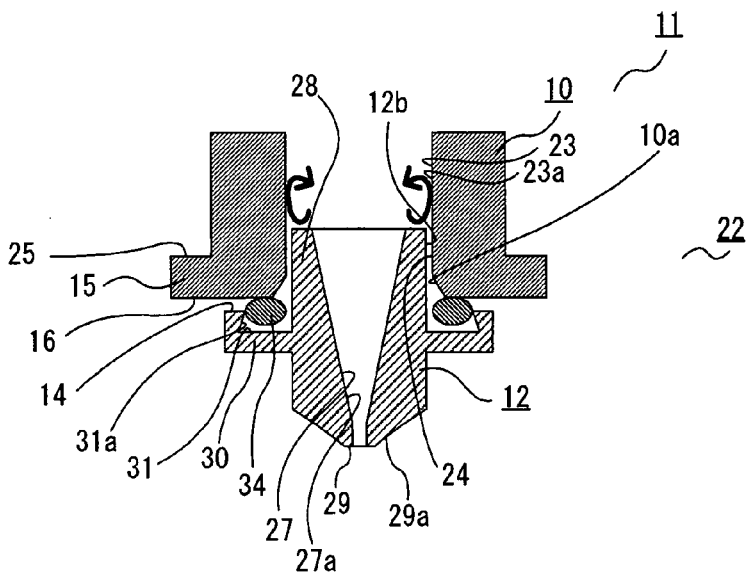
Figure 10C:
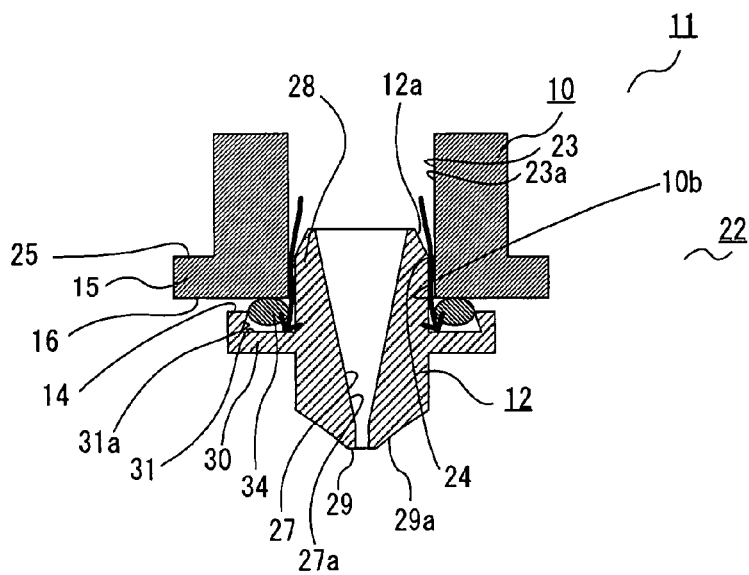

Described below with reference to FIGS. 10A, 10B and 10C is how the sloping surface 10a of the machining head element 10 and the sloping surface 12a of the nozzle element 12 work in controlling assist gas flows. The sloping surface 10a of the machining head element 10 and the sloping surface 12a of the nozzle element 12 are formed to create ideal flows of the assist gas 20 in the earlier-described process of removing the nozzle 22 from the machining head element 10. Specifically, the assist gas 20 is ejected through the inner-head channel 23 toward the O-ring 34 which securely adheres to the machining head element 10. The assist gas 20 hitting against the O-ring 34 serves to separate the same from the machining head element 10. In the structure of the machining head 11 in which the machining head element 10 has the sloping surface 10a and the nozzle element 12 has the sloping surface 12a as shown in FIG. 10A, the assist gas 20 flows against an upper part of the O-ring 34. This makes it possible to remove both the nozzle 22 and the O-ring 34 from the machining head element 10.

If the sloping surface 12a is not formed on the nozzle element 12 but only the sloping surface 10a is formed on the machining head element 10 as shown in FIG. 10B, smooth flow of the assist gas 20 will be disrupted within the machining head element 10 as illustrated, making it difficult for the assist gas 20 to properly flow onto the O-ring 34 and potentially leaving the O-ring 34 securely adhering to the machining head element 10. If the sloping surface 10a is not formed on the machining head element 10 but only the sloping surface 12a is formed on the nozzle element 12 as shown in FIG. 12C, on the other hand, the assist gas 20 is likely to flow into an area beneath the O-ring 34 as illustrated, potentially leaving the O-ring 34 securely adhering to the machining head element 10. It should be appreciated from the above discussion that the sloping surface 10a of the machining head element 10 and the sloping surface 12a of the nozzle element 12 together work effectively in controlling the assist gas flows.

Figure 11A:
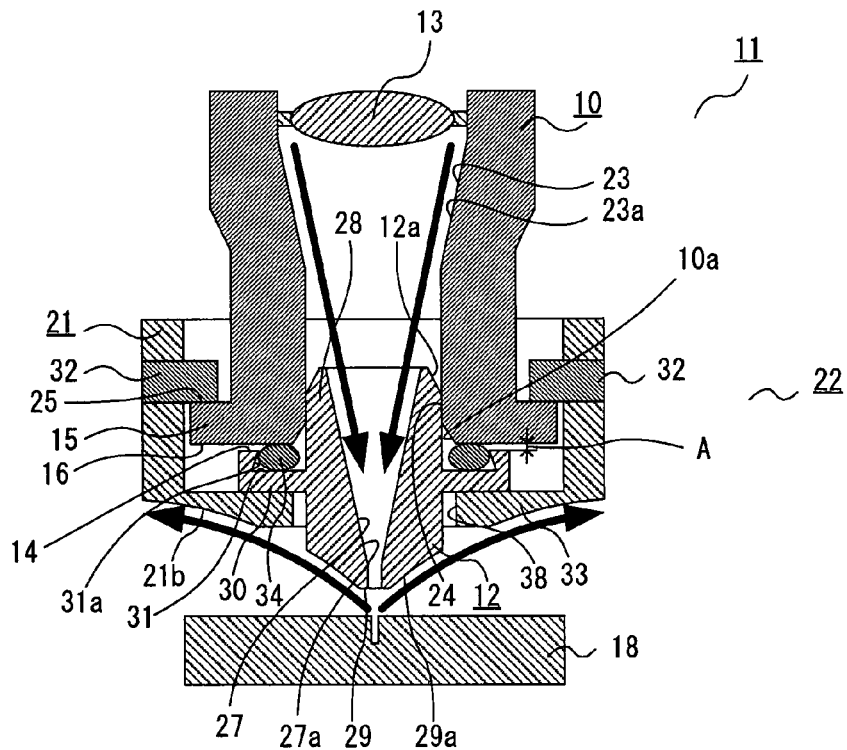
FIGS. 11A and 11B are cross-sectional diagrams also showing how the machining head of FIG. 1 works in controlling assist gas flows.
Figure 11B:
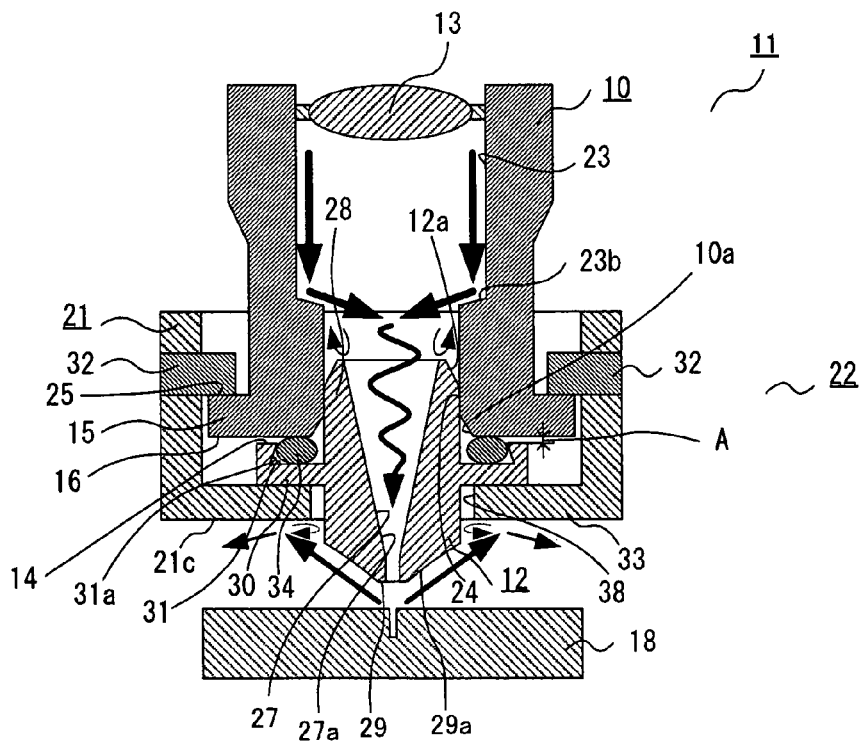

Described next with reference to FIGS. 11A and 11B is how the generally cylindrical sloping surface 23a of the inner-head channel 23 formed in the machining head element 10, the generally cylindrical sloping surface 27a of the inner-nozzle channel 27 and the curved surface 29a surrounding the nozzle orifice 29 formed in the nozzle element 12 and the curved surface 21b formed on the nozzle fixture 21 work in controlling assist gas flows. As shown in FIG. 11A, the generally cylindrical sloping surface 23a of the inner-head channel 23 and the generally cylindrical sloping surface 27a of the inner-nozzle channel 27 formed in the machining head element 10 and the nozzle element 12, respectively, have generally streamlined cross-sectional contour lines to provide continuity between the two sloping surfaces 23a, 27a. This structure serves to prevent a disturbance of assist gas flows in the nozzle 22 and thus maintain a desired level of machining quality. The curved surface 29a formed around the nozzle orifice 29 and the curved surface 21b formed on the nozzle fixture 21 also have generally streamlined cross-sectional contour lines to provide continuity between the two curved surfaces 21b, 29a. This structure serves to prevent disturbances of flows of the assist gas 20 bouncing back from the work 18 and of molten pieces of the work 18 which are carried away by the assist gas 20.

If the inside wall surface of the machining head element 10 forming the inner-head channel 23 is shaped to form a stepped surface 23b as shown in FIG. 11B, for example, the stepped surface 23b may disrupt the smooth flow of the assist gas 20 and produce a disturbance of the assist gas flows, making it impossible to achieve the desired level of machining quality.

In addition, if the downstream end portion of the nozzle fixture 21 is shaped to form a horizontal surface 21c as shown in FIG. 11B, the flows of the assist gas 20 bouncing back from the work 18 and of the molten pieces of the work 18 which are carried away by the assist gas 20 may be disturbed, making it impossible to achieve the desired level of machining quality. It should be appreciated from the above discussion that the generally cylindrical sloping surface 23a of the inner-head channel 23 formed in the machining head element 10, the generally cylindrical sloping surface 27a of the inner-nozzle channel 27 and the curved surface 29a surrounding the nozzle orifice 29 formed in the nozzle element 12 and the curved surface 21b formed on the nozzle fixture 21 together work effectively in controlling the assist gas flows.

Described below with reference to FIGS. 12A, 12B, 13A and 13B is how the sloping surface 31a of the annular groove 31 and the O-ring 34 (elastic member) fitted therein work together. If the curved inside surface of the outer wall of the annular groove 31 forms a vertical surface 31b, instead of the sloping surface 31a, the O-ring 34 may be nipped between the head alignment part 16 and the nozzle alignment part 14 when compressed as shown in FIG. 12A in the annular groove 31. Should this situation occur, the nozzle element 12 and the machining head element 10 will not go into close contact with each other. According to the invention, the annular groove 31 is surrounded by the inwardly sloping surface 31a so that the O-ring 34 deforms more or less inwardly when compressed as shown in FIG. 12B and the nozzle element 12 and the machining head element 10 go into close contact with each other. Thus, the nozzle alignment part 14 of the nozzle element 12 and the head alignment part 16 of the machining head element 10 are held in direct contact with each other with the O-ring 34 sealing any gap therebetween.

If the annular groove 31 has the vertical surface 31b, the pressure of the assist gas 20, when supplied to the nozzle 22, will cause the O-ring 34 to deform as illustrated in FIG. 13A. Consequently, the assist gas 20 will leak in an irregular fashion and this irregularity in assist gas leakage can result in a disturbance of assist gas flows in the nozzle 22, potentially causing deterioration of machining quality. By comparison, in the structure of the present invention in which the annular groove 31 is surrounded by the inwardly sloping surface 31a, the assist gas 20 does not leak even when the O-ring 34 deforms due to the pressure of the assist gas 20, so that the assist gas flows in the nozzle 22 are not disturbed and the desired level of machining quality can be achieved. It should be appreciated from the above discussion that the sloping surface 31a of the annular groove 31 and the O-ring 34 (elastic member) fitted therein together work effectively in preventing assist gas leakage and controlling the assist gas flows.

Variations of the machining head 11 of the first embodiment are now described with reference to FIGS. 23, 24A, 24B, 25A and 25B.

FIG. 23 is a cross-sectional view of a machining head according to one variation of the first embodiment of the invention, in which elements like those of the first embodiment are designated by like reference numerals and a description of such elements are not given below again. The machining head of this variation shown in FIG. 23 differs from the machining head 11 of the first embodiment in that the O-ring 34 is fitted in an annular groove 45 formed in a bottom surface of a machining head element 10. In the machining head thus structured, an upstream end 28 of a nozzle element 12 may slide along the O-ring 34 in frictional motion when the upstream end 28 of the nozzle element 12 is inserted into a joint portion 24 of the machining head element 10. However, the machining head of this variation is structured otherwise the same way as the machining head 11 of the first embodiment and produces the same advantageous effects as thus far described.

FIGS. 24A and 24B are cross-sectional and perspective views of a machining head according to another variation of the first embodiment of the invention, in which elements like those of the first embodiment are designated by like reference numerals and a description of such elements are not given below again. The machining head of this variation differs from the machining head 11 of the first embodiment in that a nozzle 6 includes a nozzle element 12 alone and a pair of pins 8 protrudes radially outward from a curved outer surface of an upstream end 28 of the nozzle 6. Additionally, in an inside surface of a joint portion 24 of a machining head element 110, there are formed pin-locking parts 39 made as grooves in which the pins 8 are locked as well as pin-fitting openings (not shown) connecting to the pin-locking parts 39.

In this variation of the first embodiment, the nozzle 6 is assembled with the machining head element 110 as described below. First, the pins 8 of the nozzle 6 are inserted into the pin-fitting openings formed in the machining head element 110, whereby the upstream end 28 of the nozzle 6 is fitted into the machining head element 110. Next, the nozzle 6 is rotated so that the pins 8 turn and fit into the pin-locking parts 39 (grooves) of the machining head element 110. At this point, the nozzle 6 is mated with the machining head element 110. The above-described nozzle fitting process is reversed when removing the nozzle 6 from the machining head element 110. In the machining head of this variation, the machining head element 110 may slide along the O-ring 34 in frictional motion when the nozzle 6 is rotated in the nozzle fitting and removal processes. Nevertheless, the machining head of this variation is structured otherwise the same way as the machining head 11 of the first embodiment and produces the same advantageous effects as thus far described.

FIGS. 25A and 25B are cross-sectional and perspective views of a machining head according to still another variation of the first embodiment of the invention, in which elements like those of the first embodiment are designated by like reference numerals and a description of such elements are not given below again. The machining head of this variation is characterized by employing a nozzle 7 which is structured as if the nozzle element 12 and the nozzle fixture 21 of the first embodiment are combined into a single body. The nozzle 7 has a flangelike part 30 which serves as both a nozzle flange and a nozzle supporting part as illustrated. In the machining head of this variation, a machining head element 10 may slide along the O-ring 34 in frictional motion when the nozzle 7 is rotated in the nozzle fitting and removal processes. Nevertheless, the machining head of this variation is structured otherwise the same way as the machining head 11 of the first embodiment and produces the same advantageous effects as thus far described.

The nozzles 22 (6, 7) of the first embodiment and the variations thereof shown in FIGS. 1, 23, 24A, 24B, 25A and 25B are selectively used according to machining requirements. For example, if the machining requirements frequently vary, requiring frequent nozzle replacement, the nozzle 22 of the first embodiment (FIG. 1) of which the O-ring 34 (elastic member) is less likely to wear out may be selected. In a case where frequent nozzle damages occur, a good choice would be the nozzle 22 of the FIG. 23 which can be manufactured at minimal cost. If it is necessary to use a small-sized machining head, the nozzle 6 of FIGS. 24A and 24B containing only one constituent element (i.e., the nozzle element 12) is most suited. If the machining head need not be small-sized and does not require frequent nozzle replacement, then the nozzle 7 of FIGS. 25A and 25B of which constituent elements can be manufactured at minimal cost would be appropriate.

Since the machining heads of the first embodiment and the variations thereof are made of small numbers of constituent elements which affect the location of the focal point, it is possible to replace the nozzles and even the machining heads with high accuracy containing minimal positioning errors. According to the invention, the upstream end 28 of the nozzle 22 (6, 7) is fitted into the joint portion 24 of the machining head element 10 (110) so that the machining head element 10 (110) and the nozzle 22 can be reassembled with a high degree of concentricity therebetween and, thus, the flow direction of the assist gas 20 aligns with the optical axis of the laser light 19 with high accuracy. Since the nozzle 22 (6, 7) is affixed to the machining head element 10 (110) by means of the pins 32 (8), it is possible to easily reproduce the ideal distance between the nozzle orifice 29 and the work 18. This serves to eliminate the need to adjust vertical positioning of the nozzle 22 (6, 7) upon replacement thereof. To add, the use of two pins 32 (8) ensures that the nozzle 22 (6, 7) mated with the machining head element 10 (110) will not tilt due to the pressure of the assist gas 20. This two-pin structure does not require high accuracy in shapes of the constituent elements of the machining head, making it possible to manufacture the constituent elements at low cost. While the machining heads of the first embodiment and the variations thereof employ the O-ring 34 as an elastic member to be fitted between the nozzle 22 (6, 7) and the machining head element 10 (110), the invention is not limited to this structure. Any other type of elastic member which performs the same function as the O-ring 34 of the first embodiment may be used instead of the O-ring 34. Furthermore, although the nozzle changer 50 is built as an integral part of the laser beam machining apparatus 1 as illustrated in the FIG. 6, the invention is not limited to this example. Needless to say, the nozzle changer may be provided separately from the laser beam machining apparatus.

While the invention has thus far been described with reference to the preferred embodiment thereof, various modifications and alterations of this invention will be apparent to those skilled in the art without departing from the scope and spirit of this invention, and it should be understood that this is not limited to the illustrative embodiment set forth herein.

What is claimed is:

1. A machining head comprising:
   a machining head element having an inner-head channel formed therein to provide a passageway for laser light and assist gas;
   a nozzle formed separately from said machining head element, said nozzle having an inner-nozzle channel formed therein to connect to the inner-head channel and a nozzle orifice through which the laser light and the assist gas are directed toward a work, the nozzle orifice being formed at an extreme downstream end of said nozzle;
   pins formed to protrude radially from a side wall of said nozzle;
   a pin-locking part formed on a side wall of said machining head element, the pin-locking part having pin-fitting openings to allow said pins to be passed through and then placed in direct contact with and locked in position on the pin-locking part;
   a head alignment part formed on a nozzle-side end surface of said machining head element;
   a nozzle alignment part formed on said nozzle at a location where said nozzle is aligned with said machining head element; and
   an elastic member fitted between the head alignment part and said nozzle in a closed loop form to create a clearance between the head alignment part and the nozzle alignment part for mutual alignment.

2. The machining head according to claim 1, wherein said pins protrude radially inward from a curved inner surface of the side wall of said nozzle, and the pin-locking part is formed on the outside of the side wall of said machining head element.

3. The machining head according to claim 1, wherein said pins protrude radially outward from a curved outer surface of the side wall of said nozzle, and the pin-locking part is formed on the inside of the side wall of said machining head element.

4. The machining head according to claim 1, wherein said pins are formed at two locations at 180-degrees interval around the side wall of said nozzle, and said pin-fitting openings are formed at two locations at 180-degrees interval around the side wall of said machining head element.

5. The machining head according to claim 1, wherein an upstream end of said nozzle opposite to the downstream end thereof in which the nozzle orifice is formed is fitted into and joined to a joint portion of the inner-head channel formed in said machining head element.

6. The machining head according to claim 1, wherein said machining head element is provided with a head flange formed on a curved outer surface of said machining head element to extend outward therefrom, and wherein a bottom side of the head flange serves as the head alignment part and a top side of the head flange serves as the pin-locking part.

7. The machining head according to claim 2, wherein said nozzle includes a nozzle element and a nozzle fixture which are formed separately from each other, said nozzle element having the inner-nozzle channel, the nozzle alignment part and the nozzle orifice;
   wherein said nozzle element is provided with a nozzle flange formed on a curved outer surface of said nozzle element to extend outward therefrom, the nozzle flange having an annular groove formed in an upstream side thereof facing said machining head element to accommodate said elastic member, a topmost surface of the nozzle flange constituting the nozzle alignment part; and
   wherein said nozzle fixture includes said pins and has a generally tubular structure whose downstream end portion is shaped to form a nozzle supporting part for holding said nozzle element in position in close contact with a bottom side of the nozzle flange, the nozzle supporting part having a hole through which the nozzle orifice is exposed to the exterior, said pins protruding radially inward from a curved inner surface of said nozzle fixture above the nozzle supporting part.

8. The machining head according to claim 1, wherein said elastic member is an O-ring.

9. A nozzle changer for replacing a nozzle of a machining head which comprises:
   a machining head element having an inner-head channel formed therein to provide a passageway for laser light and assist gas;

said nozzle formed separately from said machining head element, said nozzle having an inner-nozzle channel formed therein to connect to the inner-head channel and a nozzle orifice through which the laser light and the assist gas are directed toward a work, the nozzle orifice being formed at an extreme downstream end of said nozzle;

pins formed to protrude radially from a side wall of said nozzle;

a pin-locking part formed on a side wall of said machining head element, the pin-locking part having pin-fitting openings to allow said pins to be passed through and then placed in direct contact with and locked in position on the pin-locking part;

a head alignment part formed on a nozzle-side end surface of said machining head element;

a nozzle alignment part formed on said nozzle at a location where said nozzle is aligned with said machining head element; and an elastic member fitted between the head alignment part and said nozzle in a closed loop form to create a clearance between the head alignment part and the nozzle alignment part for mutual alignment;

said nozzle changer comprising:

a nozzle supporting rod which is fitted into the nozzle orifice of said nozzle and thereby supports said nozzle; and a nozzle changing unit which, under conditions where said nozzle supporting rod is fitted in the nozzle orifice of said nozzle, performs nozzle fitting process in which said nozzle changing unit rotates said nozzle and causes said pins to pass through the respective pin-fitting openings of said machining head element and lock onto the pin-locking part as well as nozzle removal process in which said nozzle changing unit rotates said nozzle and causes said pins to pass through the respective pin-fitting openings of said machining head element to disengage said nozzle therefrom.

10. A laser beam machining apparatus comprising:

a machining head which comprises:

a machining head element having an inner-head channel formed therein to provide a passageway for laser light and assist gas;

a nozzle formed separately from said machining head element, said nozzle having an inner-nozzle channel formed therein to connect to the inner-head channel and a nozzle orifice through which the laser light and the assist gas are directed toward a work, the nozzle orifice being formed at an extreme downstream end of said nozzle;

pins formed to protrude radially from a side wall of said nozzle;

a pin-locking part formed on a side wall of said machining head element, the pin-locking part having pin-fitting openings to allow said pins to be passed through and then placed in direct contact with and locked in position on the pin-locking part;

a head alignment part formed on a nozzle-side end surface of said machining head element;

a nozzle alignment part formed on said nozzle at a location where said nozzle is aligned with said machining head element; and an elastic member fitted between the head alignment part and said nozzle in a closed loop form to create a clearance between the head alignment part and the nozzle alignment part for mutual alignment;

a laser oscillation unit for producing the laser light to be led into said machining head;

an assist gas supply unit for supplying the assist gas to be fed into said machining head; a stage on which said work is placed; and a moving device for adjusting the position of a specified point of said stage relative to the position of said machining head element.

11. The laser beam machining apparatus according to claim 10 further comprising:

a nozzle changer for replacing said nozzle of said machining head, said nozzle changer comprising:

a nozzle supporting rod which is fitted into the nozzle orifice of said nozzle and thereby supports said nozzle; and a nozzle changing unit which, under conditions where said nozzle supporting rod is fitted in the nozzle orifice of said nozzle, performs nozzle fitting process in which said nozzle changing unit rotates said nozzle and causes said pins to pass through the respective pin-fitting openings of said machining head element and lock onto the pin-locking part as well as nozzle removal process in which said nozzle changing unit rotates said nozzle and causes said pins to pass through the respective pin-fitting openings of said machining head element to disengage said nozzle therefrom;

wherein said moving device adjusts the relative position of said machining head element and said nozzle changer.

12. The laser beam machining apparatus according to claim 10, wherein said pins protrude radially inward from a curved inner surface of the side wall of said nozzle, and the pin-locking part is formed on the outside of the side wall of said machining head element.

13. The laser beam machining apparatus according to claim 10, wherein said pins protrude radially outward from a curved outer surface of the side wall of said nozzle, and the pin-locking part is formed on the inside of the side wall of said machining head element.

* * * * *